(12) United States Patent
Haberkern

(10) Patent No.: US 12,722,682 B1
(45) Date of Patent: Sep. 1, 2026

(54) CARRIAGE ROCKING SYSTEM

(71) Applicant: Louis Haberkern, Encinitas, CA (US)

(72) Inventor: Louis Haberkern, Encinitas, CA (US)

( * ) Notice: Subject to any disclaimer, the term of this patent is extended or adjusted under 35 U.S.C. 154(b) by 228 days.

(21) Appl. No.: 18/389,104

(22) Filed: Nov. 13, 2023

Related U.S. Application Data

(63) Continuation-in-part of application No. 17/514,803, filed on Oct. 29, 2021, now Pat. No. 11,814,096.

(51) Int. Cl.
*B62B 9/22* (2006.01)

(52) U.S. Cl.
CPC .................................... *B62B 9/22* (2013.01)

(58) Field of Classification Search
CPC ................ B62B 9/22; B62B 9/00; B62B 9/12
See application file for complete search history.

(56) References Cited

U.S. PATENT DOCUMENTS

| | | | | |
|---|---|---|---|---|
| 1,508,500 A * | 9/1924 | Bingen | B62B 9/185 | 180/166 |
| 3,997,180 A * | 12/1976 | Okubo | B62B 7/14 | 280/31 |
| 5,636,853 A * | 6/1997 | Huang | B60B 33/066 | 280/30 |
| 6,250,654 B1 * | 6/2001 | Willis | B62B 7/145 | 280/30 |
| 6,360,836 B1 * | 3/2002 | Milano, Jr. | B62B 9/00 | 280/47.38 |
| 6,588,527 B2 * | 7/2003 | Lerner | B62B 9/185 | 180/166 |
| 7,100,724 B2 * | 9/2006 | Haigh | B62B 9/22 | 180/166 |
| 7,971,885 B2 * | 7/2011 | Sanders | B62B 9/22 | 280/47.1 |
| 9,027,689 B1 * | 5/2015 | Brien | B62B 9/22 | 280/47.38 |
| 9,352,765 B2 * | 5/2016 | Vashdi | B62B 9/22 | |
| 9,623,893 B2 * | 4/2017 | Braidman | B62B 5/0026 | |
| 10,252,739 B2 * | 4/2019 | Duboff | B62B 9/142 | |
| 11,312,405 B2 * | 4/2022 | Badal | B62B 9/22 | |
| 2011/0148058 A1 * | 6/2011 | Campos | B62B 9/102 | 280/47.12 |

FOREIGN PATENT DOCUMENTS

| | | | |
|---|---|---|---|
| WO | WO-2014070008 A2 * | 5/2014 | B62B 9/22 |

* cited by examiner

*Primary Examiner* — James M Dolak
(74) *Attorney, Agent, or Firm* — The Law Office of Patrick F. O'Reilly III, LLC

(57) ABSTRACT

A carriage rocking system is provided, which is engageable to a front wheel of a carriage to impart a rocking motion thereto during travel. A wheel having a sliding hub is engaged with an axle of the front wheel of the carriage. Translation of a hub assembly to differing positions on a support member of the wheel imparts more or less rocking motion to the carriage.

20 Claims, 15 Drawing Sheets

CARRIAGE ROCKING SYSTEM

CROSS-REFERENCE TO RELATED APPLICATIONS

This is a continuation-in-part of U.S. patent application Ser. No. 17/514,803, entitled "Carriage Rocking System", filed on Oct. 29, 2021, the disclosure of which is hereby incorporated by reference as if set forth its entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

This invention generally relates to child carrier devices. More particularly, the disclosed device relates to a wheeled system for a stroller or infant carriage which will rock the carriage and the child occupant thereof during rolling of the carriage.

2. Background and Description of Related Art

Strollers and baby carriages and the like have been employed by parents and persons providing child care for moving a child about for hundreds of years. Where a child is an infant and unable to walk, the baby carriage or infant stroller provides the user the ability to comfortably position the child on a bed or the like within the carriage, and then easily transport them by pushing the wheeled carriage. Such allows both the child a comfortable positioning where they may sleep or where they may view the world surrounding the carriage as the carriage is pushed about.

Most such baby carriages include a body portion having an interior cavity which is configured to allow the child or infant to lie on a bed or the like positioned therein. Such carriages support the body portion on a frame or carriage which has wheels thereon to provide for easy rolling of the carriage with the infant or child positioned therein.

Conventionally, such carriages are configured with a plurality of wheels engaged upon axles operatively connected to the frame. In some modes, the carriages employ four wheels where the rear wheels are fixed and roll in parallel upon the surface on which the carriage is being moved. In such a four wheeled carriage version, the two forward or front wheels are portioned on axles which are engaged to rotating mounts. This allows for steering the carriage, during use, by imparting a turning force to a carriage handle which turns the front wheels in the direction desired for rolling.

Also conventionally employed for such infant strollers and carriages are three-wheeled versions. In the three-wheeled version the two rear wheels, adjacent the handle of the carriage, operate in the same fashion as that of the four wheeled carriages in that they rotate in a fixed parallel configuration. A single front wheel is mounted on a steering axle which is engaged to a fork or other support or steering member rotationally connected to the frame. To turn the carriage, the user imparts force to the handle, engaged therewith, and the fork or steering member will rotate thereby rotating the single front wheel in the direction the user wishes to steer the carriage.

The forgoing examples of related art as to infant carriages and strollers, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

BRIEF SUMMARY OF EMBODIMENTS OF THE INVENTION

Accordingly, the present invention is directed to a carriage rocking system that substantially obviates one or more problems resulting from the limitations and deficiencies of the related art.

In accordance with one or more embodiments of the present invention, there is provided a carriage rocking system that includes an axle coupled to a wheel mount member which is configured for engagement to a carriage; a rim, the rim having an exterior circumference engageable with a tire; the rim having a support member communicating across an interior opening within the exterior circumference; a slot in the support member; a hub assembly in a sliding engagement with the support member; the hub assembly having at least one bearing therein; an axle passage communicating through the at least one bearing and through the slot, the axle passage engageable to the axle of the wheel mount member; the hub assembly in the sliding engagement with the support member; a removable engagement of the hub assembly removably mounting the support member to any of a plurality of respective mounting positions upon the support member between a first the mounting position to a last the mounting position; and a first of the mounting positions being centered within the exterior circumference of the rim, the last of the mounting positions being closest to the exterior circumference of the rim.

In a further embodiment of the present invention, the wheel mount member comprises a forked wheel mount member, the forked wheel mount member including a first tine and a second tine spaced apart from the first tine, and the forked wheel mount member having a first end and a second end, the first end of the forked wheel mount member configured for engagement to the carriage, and the axle positioned at the second end of the wheel mount member with a portion of the rim being disposed between the first tine and the second tine.

In yet a further embodiment, the axle extends between the first tine and the second tine, a first end portion of the axle having a first fastener member disposed thereon proximate to the first tine, and a second end portion of the axle having a second fastener member disposed thereon proximate to the second tine so as to secure the axle to the first and second tines.

In still a further embodiment, the carriage rocking system further comprises a first rib extending from a first surface of the support member; a second rib extending from the first surface of the support member opposite to and parallel to the first rib; a recess positioned between the first rib, the second rib, and the first surface of the support member; and the sliding engagement of the hub assembly being within the recess.

In yet a further embodiment, the removable engagement of the hub assembly comprises a first plurality of openings formed into the first rib; a second plurality of openings formed into the second rib; a first pin extending from a first side of the hub assembly, the first pin positionable in a removably biased engagement with any of the first set of openings; and a second pin extending from a second side of the hub assembly, the second pin positionable in a removably biased engagement with any of the second set of openings.

In still a further embodiment, the carriage rocking system further comprises the at least one bearing of the hub assembly including a first bearing and a second bearing; the hub assembly having a first hub section, the first bearing engaged with the first hub section; the hub assembly having a second hub section positioned upon an opposite side of the support member from the first hub section, the second hub section being connected to the first hub section; the first hub section having a hub cavity therein; a first body portion slidably engaged within the hub cavity; a second body portion slidably engaged within the hub cavity; a biasing member engaged between the first body portion and the second body portion in a gap therebetween, the biasing member biasing the first body portion away from the second body portion; the first pin extending from a mount upon the first body portion; and the second pin extending from a mount upon the second body portion.

In yet a further embodiment, the carriage rocking system further comprises the second bearing engaged with the second hub section, the second bearing having a secondary axle passage therein; and the axle passage communicating through the first bearing and through the slot, and through the secondary axle passage.

In still a further embodiment, the rim comprises a first rim section and a second rim section, and the support member is disposed between the first rim section and the second rim section.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The accompanying drawings, which are incorporated herein and form a part of the specification, illustrate some, but not the only or exclusive, examples of embodiments and/or features of the rocking system for an infant carriage disclosed herein. It is intended that the embodiments and figures disclosed herein are to be considered in all cases illustrative, rather than limiting.

In the drawings.

Throughout the figures, the same parts are always denoted using the same reference characters so that, as a general rule, they will only be described once.

Figure 1:
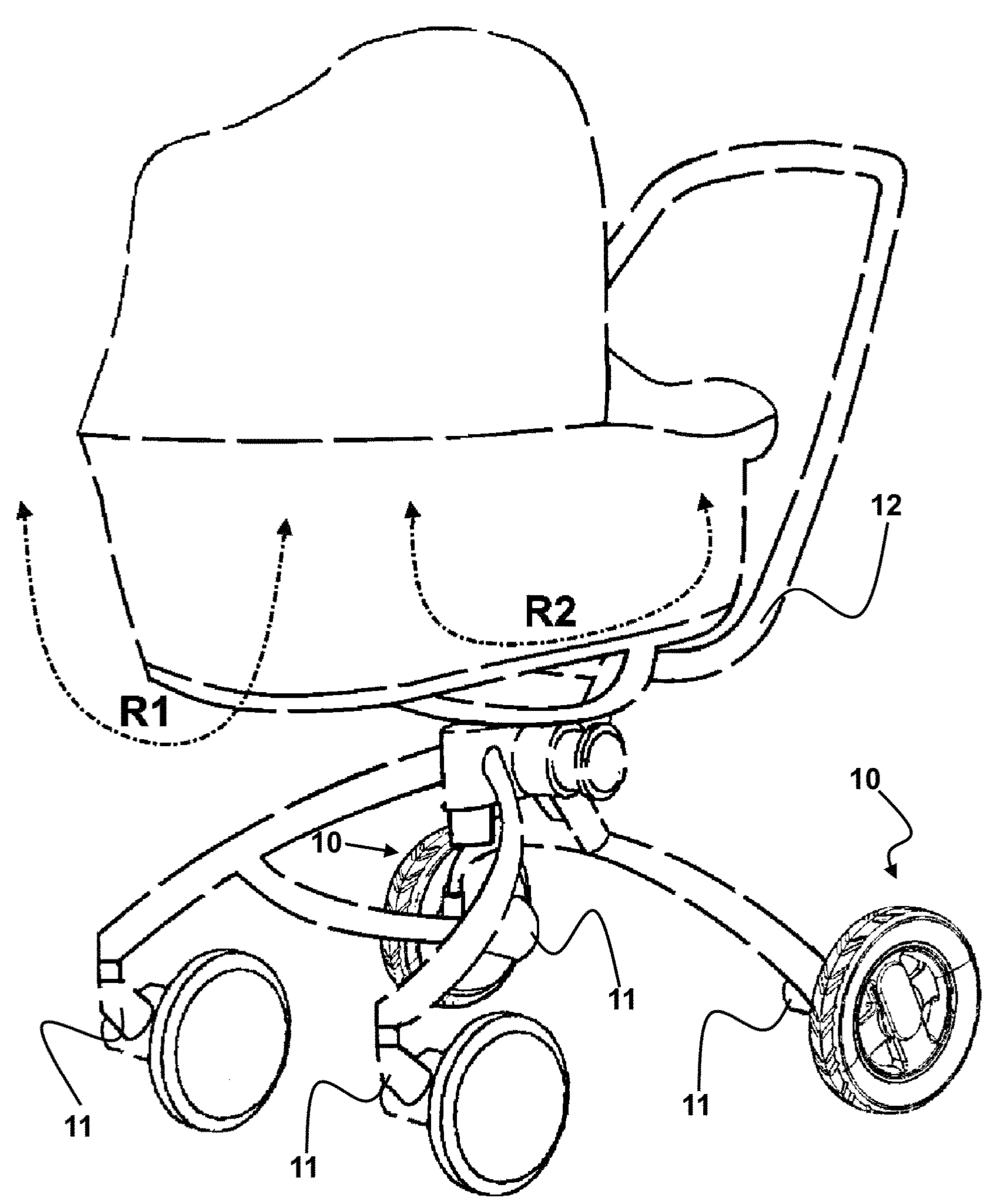
FIG. 1 depicts one illustrative embodiment of the rocking system, for an infant carriage herein, wherein the carriage includes two wheels configured to rock the carriage as disclosed herein in the R1 or R2 direction depending on whether the two rotate in concert or independently.

Other aspects of the disclosed rocking wheel system and configuration for an infant carriage disclosed herein will be more readily understood when considered in conjunction with the accompanying drawings, and the following detailed description, neither of which should be considered limiting.

DETAILED DESCRIPTION OF EMBODIMENTS OF THE INVENTION

In the embodiments described hereinafter, the system herein provides for wheels which when operatively engaged to the appropriate axle of an infant carriage will impart a rocking motion to the carriage. The amount of such rocking motion so imparted to the carriage that the wheel or wheels are engaged to is easily adjustable by the user through the employment of a hub mount which is slidably engageable within a support member of a rim to which a wheel is engaged.

In all modes of the illustrative system herein, whether employing a single rocking wheel engaged upon a single front steering axle or whether employing two rocking wheels engaged to two opposing wheels on opposite sides of the carriage, an adjustable rocking motion may be imparted to the carriage. This adjustable rocking is provided by a sliding movement of a hub assembly to various sequential positions within a recess and slot formed in a support member communicating across the interior of the rim supporting a tire thereon. The hub mount can be positioned in a first position centered within the wheel, wherein no rocking motion is communicated to the carriage. The hub mount can be translated to any of a plurality of sequential positions on the support member, which are progressively positioned further distances from this first position. The larger the distance of the positioning of the hub mount from the first position and toward the circumference of the rim, the larger the rocking motion communicated to the carriage.

In one or more embodiments, the progressive individual positions of the hub mount from the first position to a last position are enabled by engagement of biased pins, located on the hub mount, to individual openings formed into the support member located on opposite sides of the slot therein. A first pair of openings provides for positioning of the hub mount to the first position wherein an outer hub, which engages an axle operatively connected to the wheel, is substantially centered within the circular rim engaged to the tire on which the wheel rolls. Successive spaced pairs of openings are located on opposing sides of the slot into which the user may engage the biased pins to adjust the amount of rocking motion imparted to the carriage. Positioning of the hub mount to engage the biased pins in each successive pair of openings will impart a larger rocking to the carriage. This is because the outer hub engaged to the hub mount, which engages the wheel axle, is positioned to an increasing off-center positioning relative to the center point of the rim.

In one or more embodiments, a visually discernable gauge of the amount of rocking a wheel having an axle engaged with an outer bearing centered in the outer hub engaged with the hub mount is provided by a first set of successive cover plate markings positioned on a cover which is engaged to a fixed position on the support member which align with a position marker located upon a tab of the moveable hub mount. As the hub mount is translated to successive positions within the slot, which are further from the first position, the position marker on the tab of the hub mount will align with a one of the first set of markings to show how much rocking motion will be imparted by the wheel to the carriage.

In one or more embodiments, the hub mount, as noted, is positionable to multiple positions within the slot formed in the support member. Sliding pins, operatively engaged to the hub mount, are biased to outward positions which will engage with a chosen pair of openings positioned on opposite sides of the slot. Disengagement of these pins from the openings is provided by paddles connected to the pins which, when depressed, will overcome the biased projection position of the pins and allow the hub mount to slide along opposing rails positioned on opposite sides of the slot. Once the desired positioning of the hub mount is achieved, which can be determined by viewing which of the successive markings is aligned with the position marker, the user can release the pressured contact with the paddles which will cause the pins to engage with the appropriate openings relating to the aligned marking with the position marker.

In one or more embodiments, the hub mount has an interior cavity which is sized to engage and hold the exterior surface of an outer hub. This outer hub has a bearing centered therein through which an axle connected to the wheel is operatively positioned. Thus, as the outer hub is translated from the first position to various positions along the length of the slot, the wheel engaged to this axle is progressively positioned more or less off-center from the center point of the wheel rim.

In one or more embodiments, the hub mount, with the outer hub positioned within the interior cavity thereof, is connected to an interior hub located on an opposite side of the support member from both the outer hub and the hub mount. Thus, the support member is in a sandwiched engagement in between the hub mount with the outer hub engaged therein, and the inner hub. This connection maintains the assembled device on the support member and allows the device to translate from the first position, which locates the outer bearing axial cavity in which the wheel axle engages to a centered position with the circumference of the rim, to the various non-centered positions which impart a rocking to the carriage. The inner hub can also have an inner bearing therein with an axial opening which aligns with the axial cavity of the outer bearing. The axle, supporting the rim of the wheel of the device herein, is maintained in an engagement with the axial cavity of the outer bearing using a nut or clip or other connector which is positioned on a distal end of the axle such as a distal end projecting past the inner hub.

In one or more embodiments, the wheel device herein can be employed in an OEM type manner where two of the wheel devices are engaged to two axles of a conventional carriage or with a single steering axle of a steering member of a carriage. It is also envisioned and considered within the scope of the invention herein that one or a plurality of the wheel devices herein can be retrofit to an existing infant carriage. It is within the scope of this patent that the wheel device can be added to an existing axle of a carriage or be provided with a support or steering member that is configured to attach to the carriage.

With respect to the above description, before explaining the illustrative embodiments of the herein disclosed shock absorbing user rocking system for an infant carriage in detail, it is to be understood that the disclosed rocking system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed rocking system for a rolling infant carriage. It is important, therefore, that the claims be regarded as including such equivalent construction and methodology insofar as they do not depart from the spirit and scope of the present invention.

The objects, features, and advantages of the present rocking system for an infant carriage invention, as well as the advantages thereof over existing prior art, which will become apparent from the description to follow, are accomplished by the improvements described in this specification and hereinafter described in the following detailed description which fully discloses the invention, but should not be considered as placing limitations thereon.

As used in the claims and to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined, means plus or minus ten percent.

It is an object of this invention to provide a wheel device which will impart a rocking motion to an infant carriage to which one or a plurality of such wheel devices are engaged.

It is a further object of this invention to provide such a wheel device wherein the user may adjust the amount or distance of the rocking motion from no rocking to progressively more rocking of the engaged carriage.

Other objects, features, and advantages of the present rocking wheel invention, as well as the advantages thereof over existing prior art, will become apparent from the description to follow, and are accomplished by the improvements described in this specification and hereinafter described in the following detailed description which fully discloses the invention, but should not be considered as placing limitations thereon.

In this description, the directional prepositions of up, upwardly, down, downwardly, front, back, top, upper, bottom, lower, left, right and other such terms refer to the rocking wheel device as it is oriented and appears in the drawings and are used for convenience only, and they are not intended to be limiting or to imply that the device has to be used or positioned in any particular orientation.

Now referring to drawings in FIGS. 1-13, wherein similar components are identified by like reference numerals there is seen in FIG. 1, a first illustrative embodiment of a rocking wheel device 10 herein which is configured for engagement to an infant carriage either as an OEM product provided with a carriage 12, or more preferably to enable wider employment of the device 10, as an aftermarket provided device 10 engageable to an infant or child carrier 12.

As shown in FIG. 1, where the device 10 is employed on a four-wheel type carriage 12, two wheel devices 10 will be engaged with the rear end of the carriage 12. Such will provide a rocking motion to the carriage 12 when the device 10, as described herein, is set to position the axle thereof off center from the circumference of the rim thereof.

Figure 2:
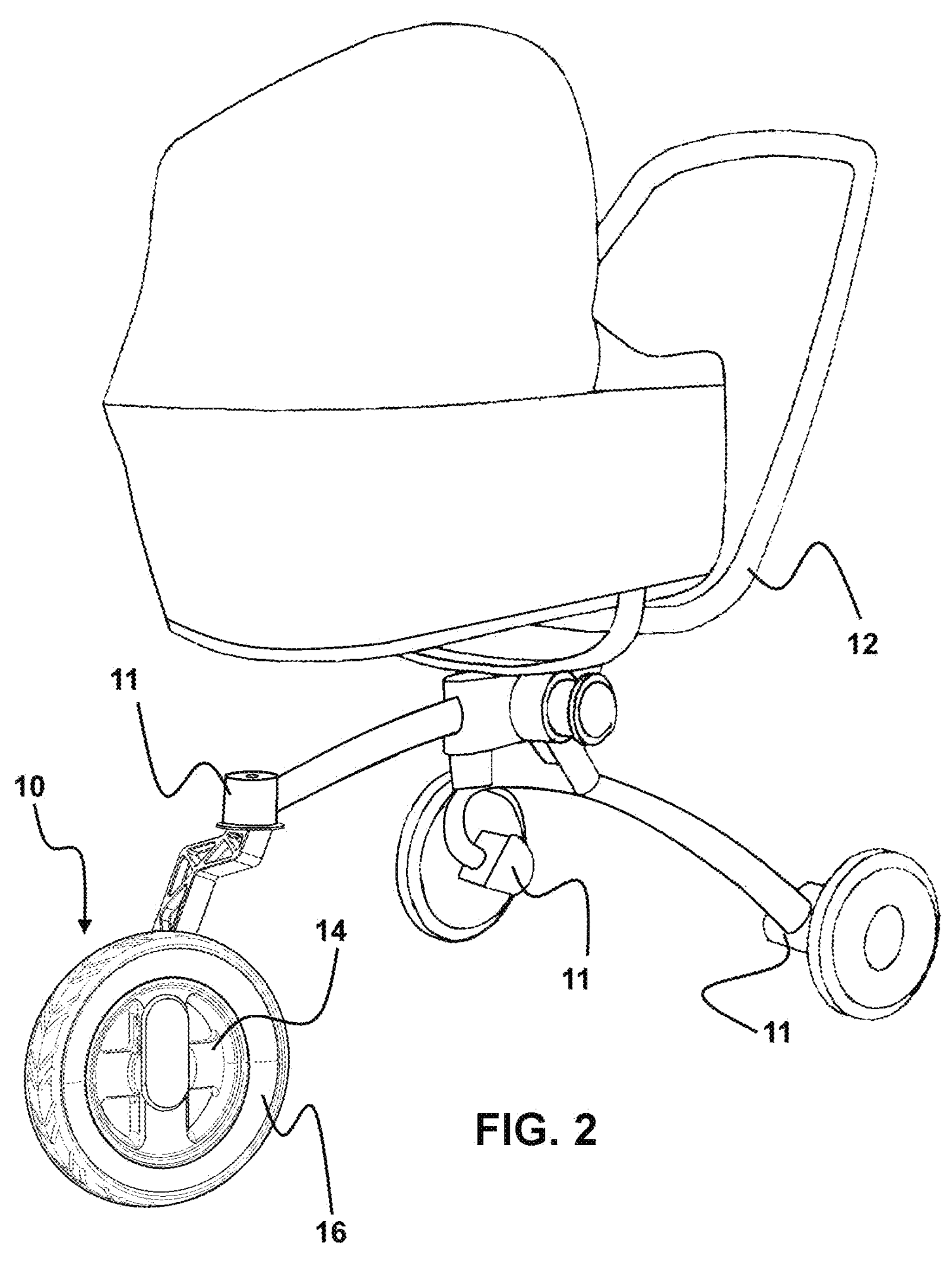
FIG. 2 depicts another illustrative embodiment of the rocking system for an infant carriage herein where a single wheel is operatively engaged to a front or steering wheel of the infant carriage which would impart rotation in the R2 direction of FIG. 1.

FIG. 2 depicts the first illustrative embodiment of the device 10 as positioned on the front or steering end of a conventional carrier 12. When provided or engaged to a carriage of this configuration, a forward to rear rocking motion is imparted to the carrier 12 as the user pushes it along a support surface.

Figure 3:
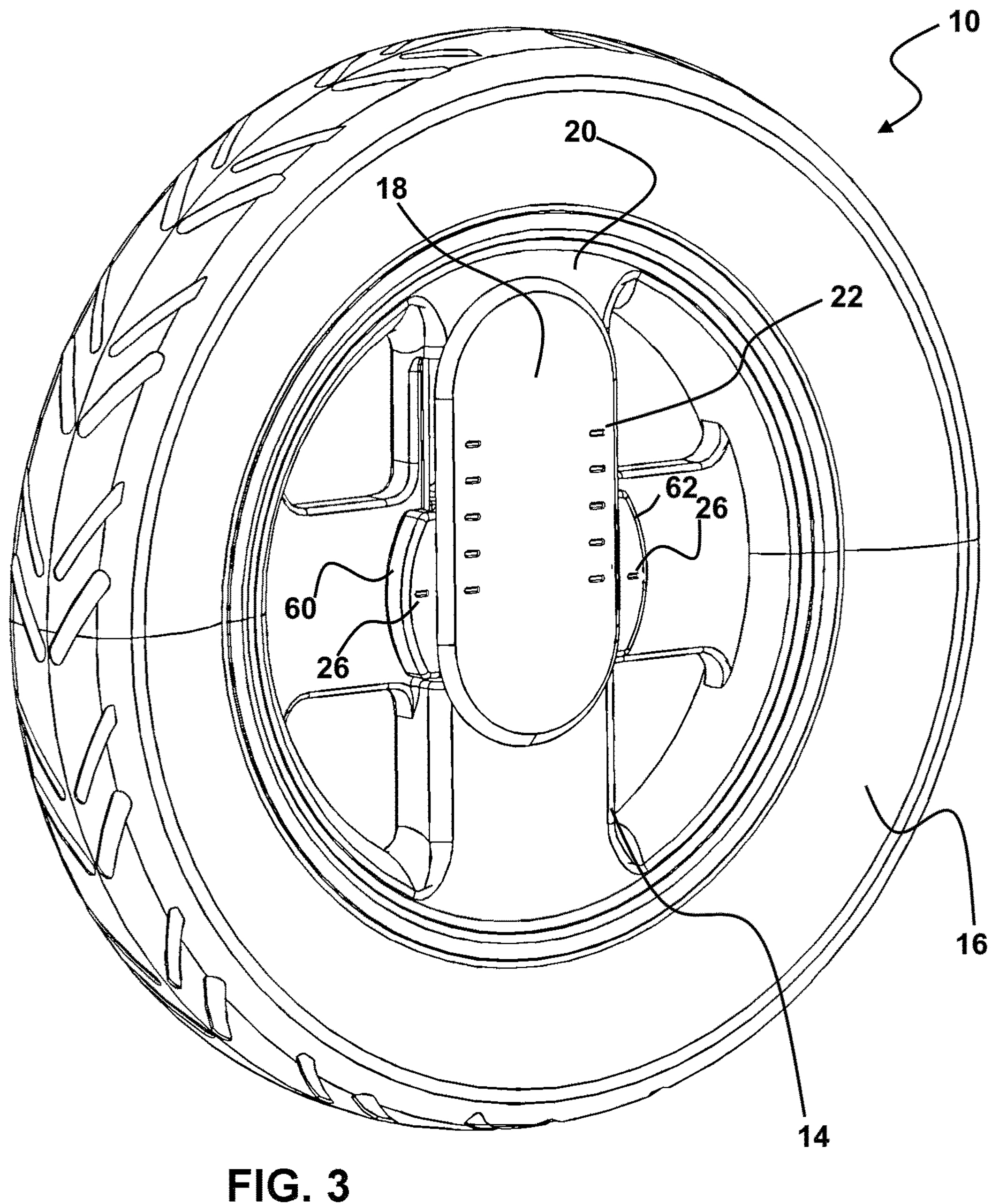
FIG. 3 depicts an exterior view of a first illustrative embodiment of the rocking wheel device, employed herein, which can be included with a carriage as in FIGS. 1-2 or which may be provided as an aftermarket device attachable to an axle of any conventional infant carriage.

As shown in FIG. 3, an outside exterior view of the first illustrative embodiment of the rocking wheel device 10 is shown. As shown, the device 10 has a rim 14 which is operatively engageable with a tire 16. The device may be provided with the rim 14 whereafter the user may install the desired tire 16, or the device 10 may include a tire 16 operatively engaged to the exterior circumference of the rim 14.

Also shown in FIG. 3 is a cover plate 18 that is affixed to a support member 20 which communicates across the interior of the rim 14. The cover plate 18 has a series of sequential positioned cover plate markings 22 located thereon. On at least one hub mount body portion 60 or 62 (FIG. 8) is located a position marker 26. During adjustment of the position of the outer hub 30 (FIG. 5) in directions toward or away from the exterior circumference 15 (FIG. 7), the moving position marker 26 will align with different individual respective cover plate markings 22 from the plurality thereof. This alignment of the position marker 26 which moves with a respective individual cover plate marking 22 thereby provides a visually discernible gauge to the user as to the amount of rocking motion the device 10 will impart to the carriage 12 to which it is operatively engaged. In the first illustrative embodiment, as indicated by the five (5) cover plate markings 22 in FIG. 3, the device 10 has five (5) rocking settings, from a zero rocking setting to a maximum rocking setting.

Figure 4:
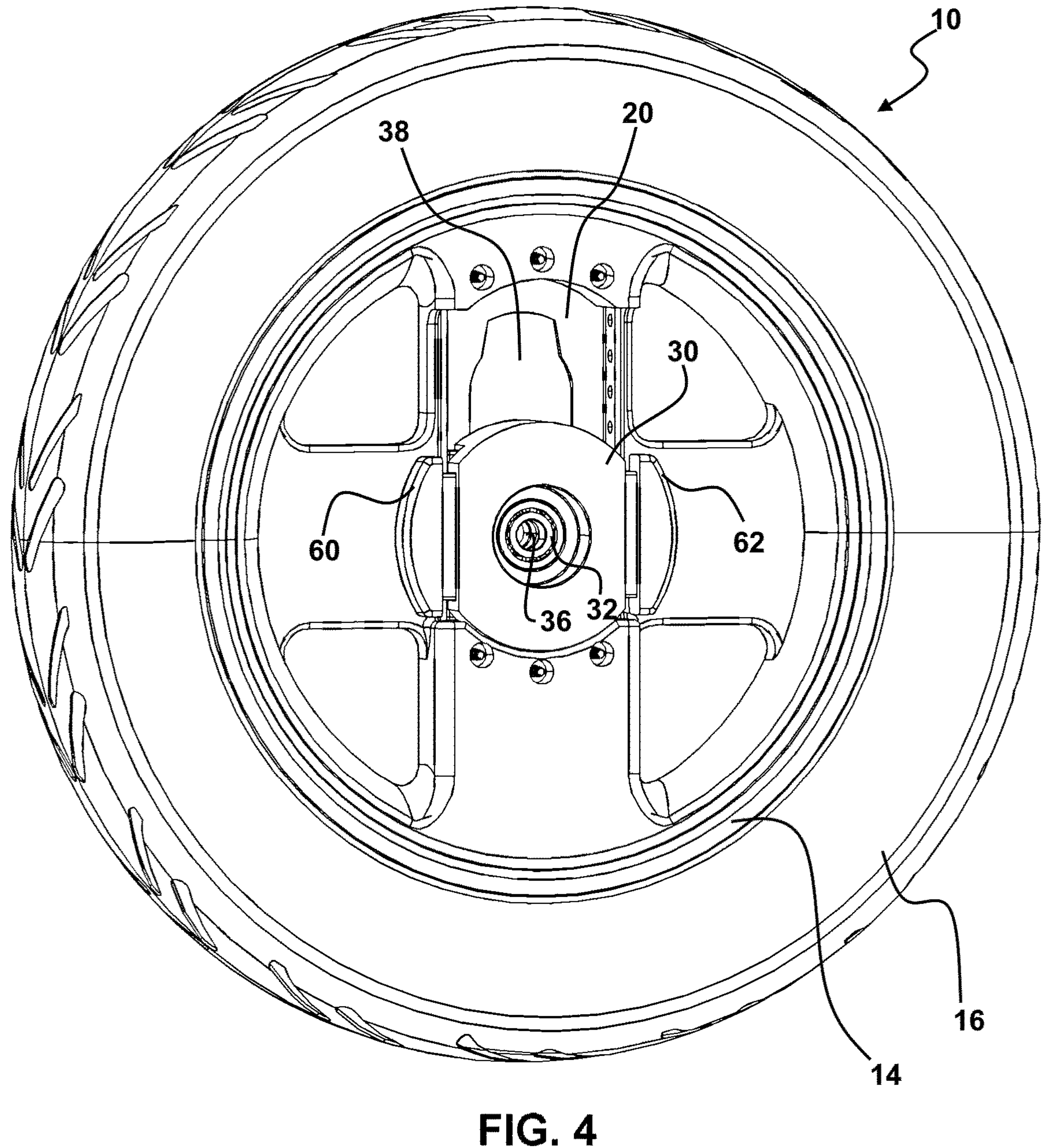
FIG. 4 shows the rocking wheel device of FIG. 3 wherein a rocking motion designating cover is removed to thereby show the exterior hub which is positionable on a support member of the rim of the wheel to different positions from a center position to off center positions.
Figures 5, 6:
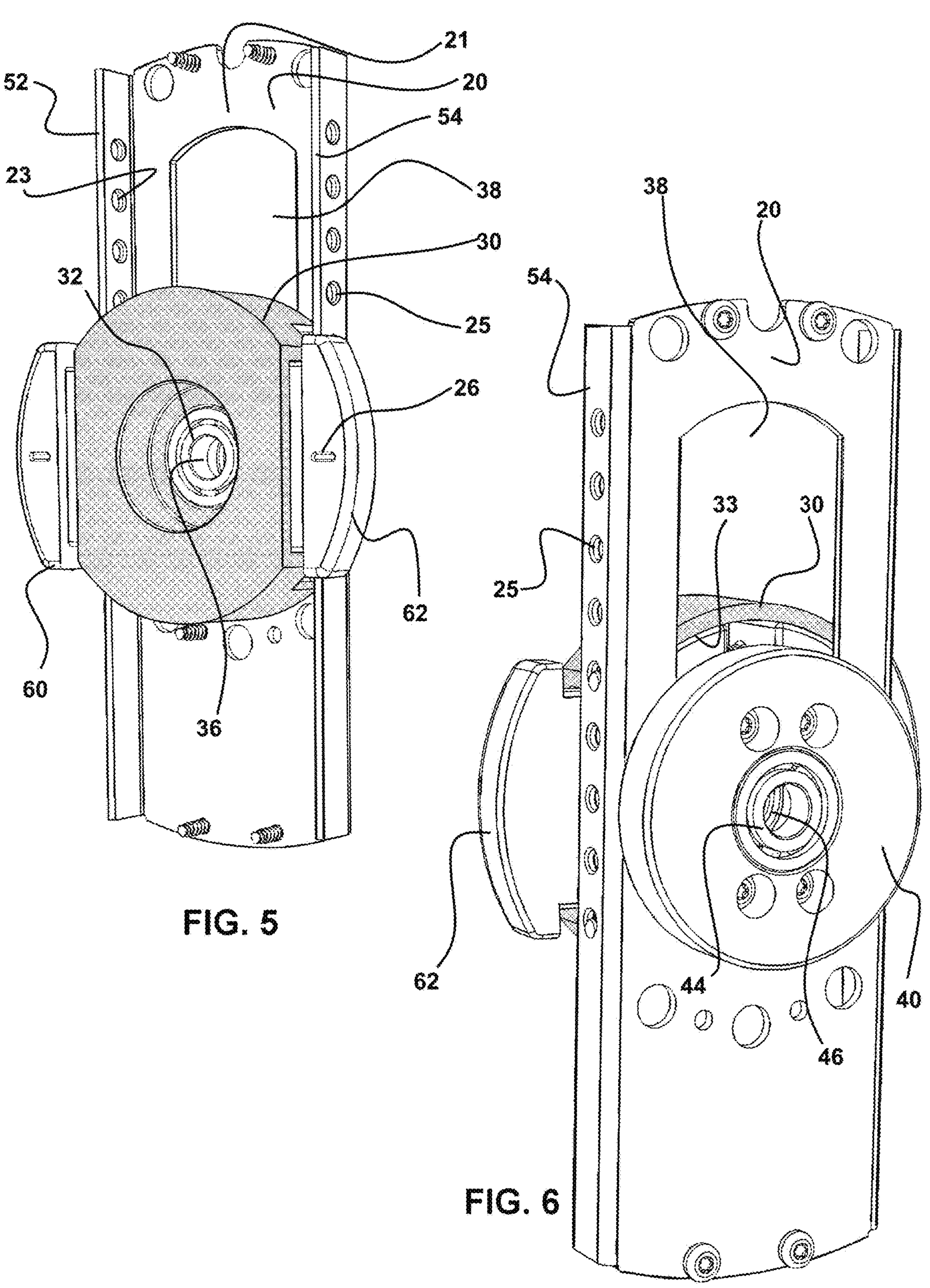
FIG. 5 shows the support member of a rocking wheel herein having a slot wherein the position of a wheel bearing held by an exterior hub is adjustable within the slot by positioning of support pins into openings formed on opposing sides of the slot.
FIG. 6 depicts a view of the opposite side of the support member showing an interior hub which is engaged by fasteners communicating through the slot to the exterior hub.

Shown in FIG. 4 is the device 10 as in FIG. 3 wherein the cover plate 18 has been removed from a fixed positioning engagement to the rim 14, such as with the support member 20. As shown, a hub assembly 29 depicted herein in FIGS. 5 and 9, for example, is slidably engaged upon the support member 20 such that it will support axle 17 of a support member or steering member 13 such as in FIG. 13, at various positions along the support member 20 from a centered position such as in FIG. 7, to sequential mounting positions which position the axle passage 36 closer to the exterior circumference 15 of the rim 14 thereby increasing an off-center position of the bearing axle passage 36 the closer the bearing axle passage 36 gets to the exterior circumference 15 of the rim 14. Thus, the hub assembly 29 is slidably positionable between a position centering the bearing axle passage 36 within the rim, such as in FIG. 13, where there would be no rocking motion of the carriage, to sequential mounting positions along the support member 20 toward the exterior circumference 15. In each such mounting position closer to the exterior circumference of the hub assembly 29, rocking will sequentially increase over the previous mounting position.

As shown, an outer hub 30 provides an operative engagement to hold an outer bearing 32 therein. The distal end of an axle 17 (FIG. 13) of the device 10 is positioned within the bearing axial passage 36. The other end of the axle 17 engages to a wheel mount of the carriage 12.

Also shown in FIG. 4 is a slot 38 formed into the support member 20 which is operatively engaged to the interior circumference of the rim 14. As described herein, the outer hub 30 is connected with fasteners to an inner hub 40. This positions the support member 20 and slot 38 therein in a sandwiched engagement in between the outer hub 30 and the inner hub 40.

As described herein, the positioning of both the outer hub 30 and the inner hub 40, and bearings therein, to differing positions within the slot 38 is provided by a hub mount 42 (see FIG. 8) which supports the outer hub 30, which is in turn engaged to the inner hub 40. Thus, movement of the hub mount 42, to positions along the elongated slot 38, concurrently moves both the outer hub 30 and inner hub 40 as well as the outer bearing 32 and an inner bearing 44 connected to the inner hub 40. While the device 10 will function without the inner bearing 44, for stability and long term endurance, the inclusion of the inner bearing 44 is preferred.

Figures 12, 13:
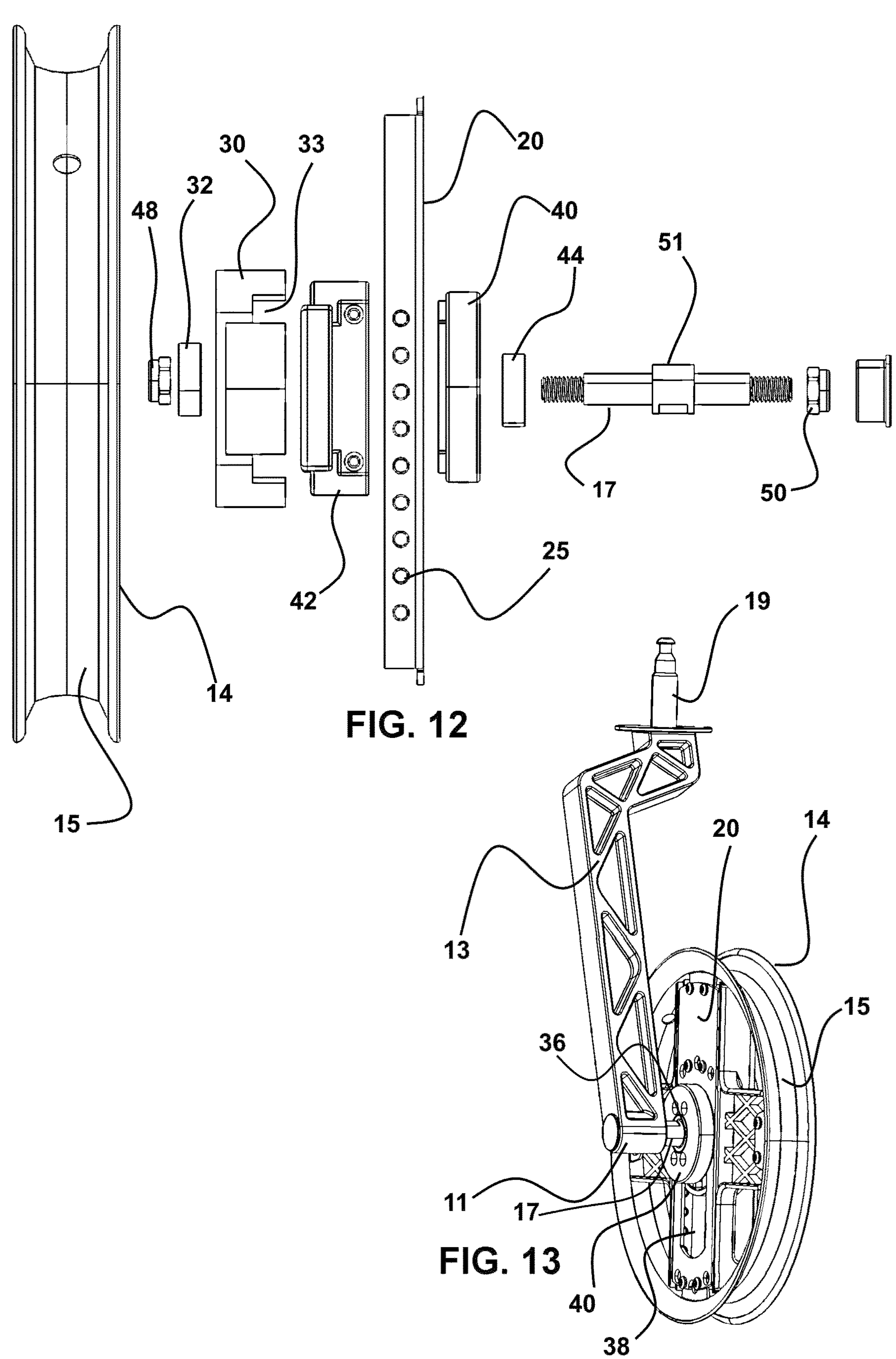
FIG. 12 is an exploded side view of the engageable components of the first illustrative embodiment of the rocking wheel device herein.
FIG. 13 depicts the wheel device showing the rim which is configured to engage a tire, and showing a steering member which can be provided for new and retrofitting of carriages with a single front wheel for steering.

As shown in the drawings, and more particularly in FIG. 12, the axle 17, of the device, communicates along an axle passage formed by the outer bearing axial passage 36 and an aligned inner bearing passage 46. A bearing connector, such as a bearing nut 48, on the distal end of the axle 17 (FIG. 13) holds the distal end and first portion of the axle 17 in place. A carriage connector, such as a carriage nut 50, holds the first end of the axle to the carriage 12.

In FIGS. 5-11 are shown components of the device herein and their movable positioning upon the support member 20. As shown, the support member 20 of the rocking wheel device 10 herein has the slot 38 therein, through which the outer hub 30 is engaged to the inner hub 40, with the hub mount 42 positioned therebetween. The support member 20 also has a recess 21 positioned between a first rib 52 and a parallel second rib 54 which extend from the support member 20.

A plurality of pairs of aligned openings are provided by first openings 23 sequentially formed into the first rib 52 and spaced apart across from and aligned with second openings 25 sequentially formed into the second rib 54. The plurality of pairs of openings are positioned with a first pair of aligned openings located closest to a center point of the rim, to a last pair of aligned openings positioned furthest from the center point of the rim. Each of the pairs of aligned openings are sequentially spaced from adjacent such pairs of aligned openings.

In operation, the position of the outer wheel bearing 32, having the bearing axial passage 36 which supports the axle 17 (FIG. 13), can be seen as being held in place by the outer hub 30. A hub mount 42, is positioned to provide a supporting engagement with the outer hub 30 by a positioning thereof within a hub cavity 33 formed in the outer hub 30. By supporting engagement is meant, for example, that the hub mount 42 positioned within the hub cavity 33 contacts against surfaces of the hub 30 defining the hub cavity 33, to thereby support the surrounding outer hub 30, to hold it in positions within the recess 21.

Because the outer hub 30 is connected to the inner hub 40, the supporting engagement of the hub mount 42 also holds the inner hub 40 in positions upon the support member 20. For example, an upper surface 64 and lower surface 66 of the hub mount 42, positioned within the hub cavity 33 contacts against hub sidewalls 35 defining the hub cavity 33.

Figures 7, 8:
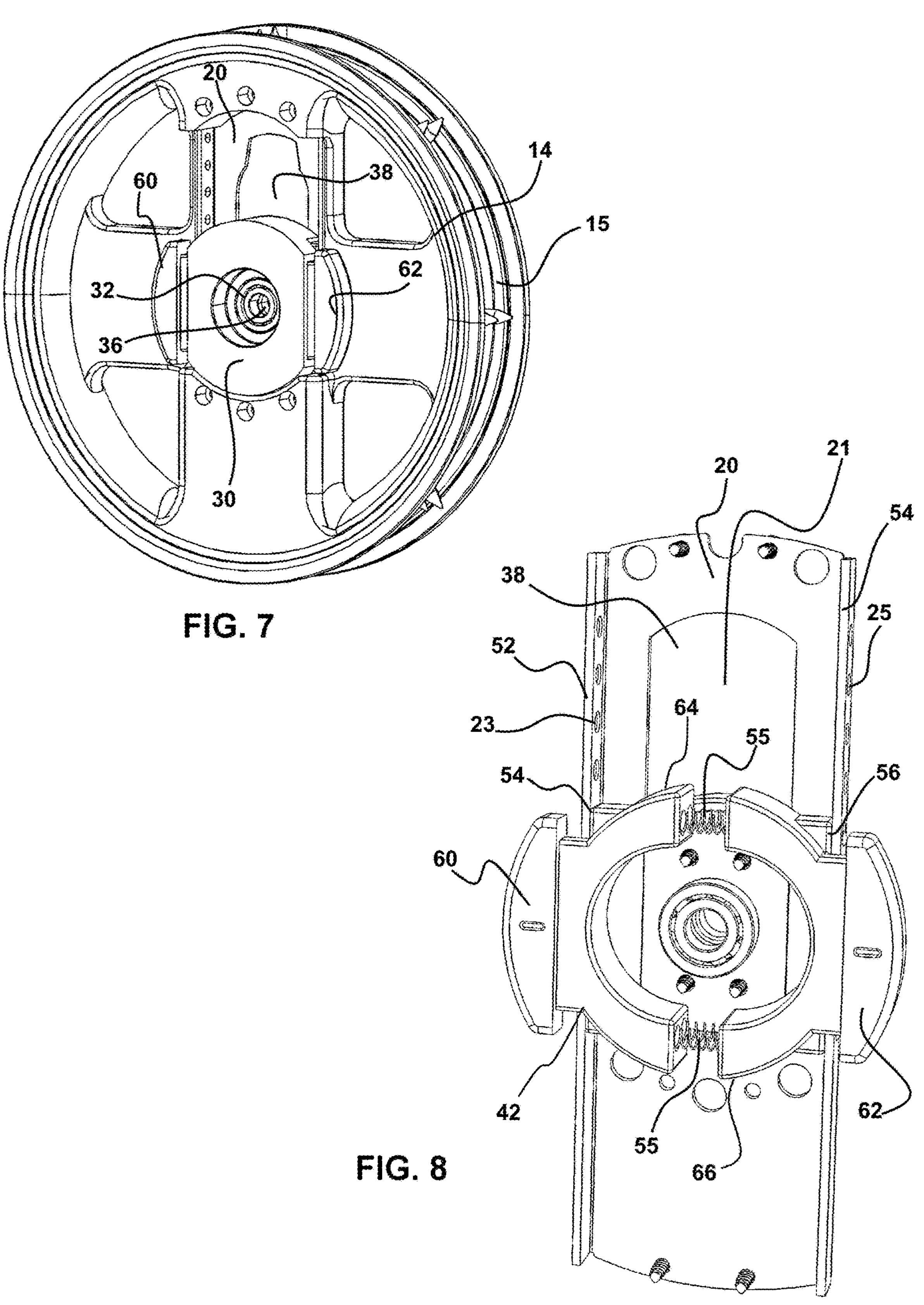
FIG. 7 shows the support member herein engaged within a rim which is adapted for engagement to a tire, and showing the exterior hub removably positioned to a centered position relative to the circumference of the rim.
FIG. 8 depicts the support member of the rocking wheel herein, such as in FIG. 5, where the exterior hub is removed to show fasteners which engage between the rear hub and front hub, and showing an adjustable connector which is employable to removably position the exterior hub to varying positions along the slot.
Figures 9, 10, 11:
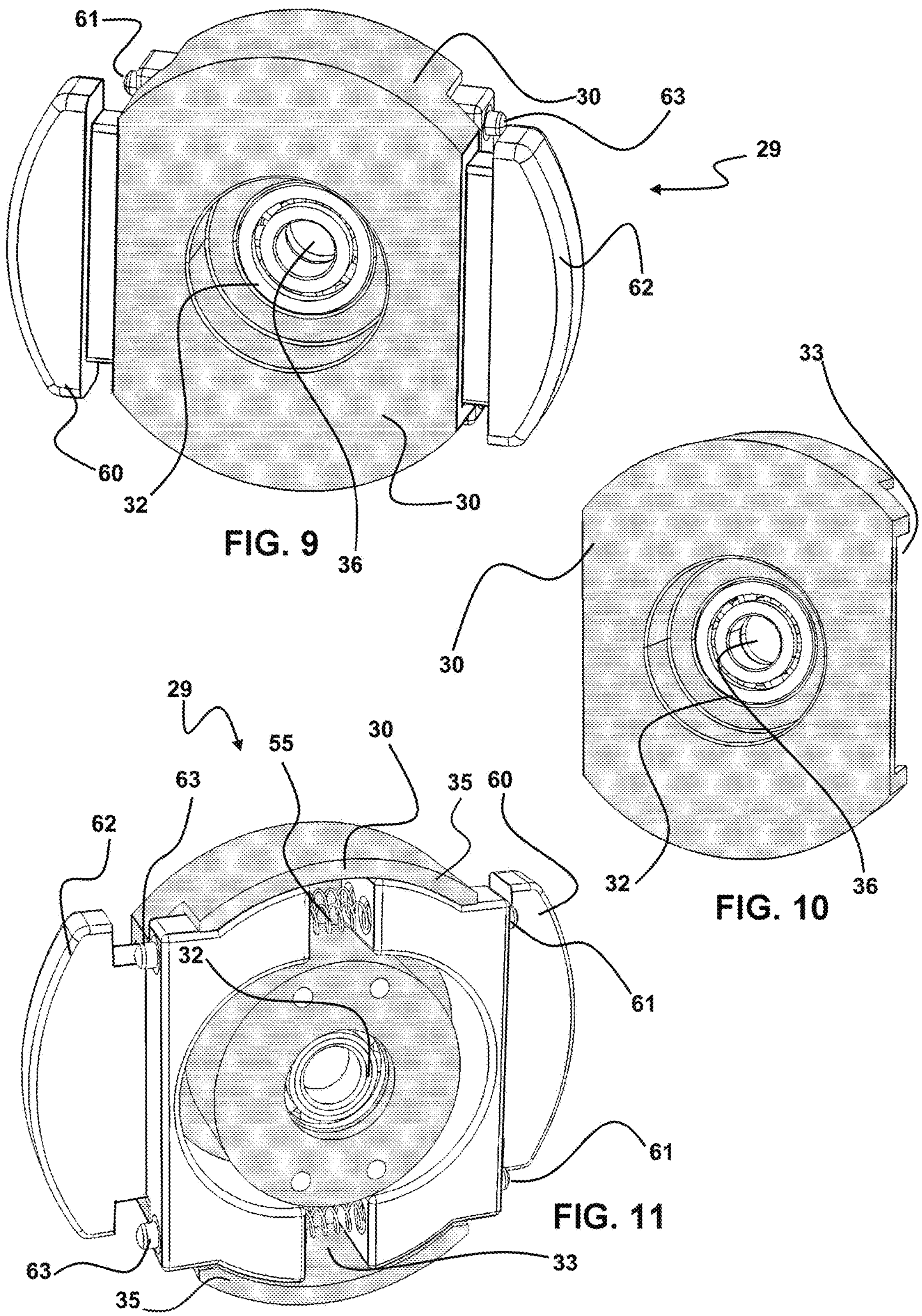
FIG. 9 shows the exterior hub in operative engagement over the connector.
FIG. 10 shows the exterior hub and an exterior bearing engaged therein which is adapted to hold the axle of a carriage.
FIG. 11 shows an opposite view from that of FIG. 9, and shows the connector operatively engaged within a cavity formed on one side of the exterior hub, wherein the connector supports the exterior hub to varying positions along the slot.

In a view of the hub mount 42, as shown in FIG. 8, the outer hub 30 has been removed to more clearly show the operation of the hub mount 42. As shown, the first rib 52 and second rib 54 run substantially parallel and project from opposing sides of the support member 20. The recess 21 is shown formed between the first rib 52 and second rib 54.

The hub mount 42 is positioned in an engagement with the outer hub 30 within the recess 33 formed in the outer hub. By engagement is meant that the outer hub 30 is supported by the hub mount 42 and is not engaged to the support member 20 other than contacting or sliding against it during translation on the support member 20.

The hub mount 42 is in a sliding engagement with the support member 20. By sliding engagement is meant, for example, that a first side surface 56 of the hub mount 42 is positioned to slide along an inner surface of the second rib 54 which faces the recess 21, and a second side surface 58 of the hub mount 42 is positioned to slide along an inner surface of the first rib 52 which faces the inner surface of the first rib.

The hub mount 42 has a first body portion 60 and a second body portion 62. A biasing member, such as springs 55, imparts a biasing force to bias the first body portion 60 toward the inside surface of the first rib 52 and the second body portion 62 against the inside surface of the second rib 54. The hub mount has a releasable locking mechanism allowing the user to slide the hub mount 42 within the recess 21 from a first position wherein it holds the outer hub 30 in a first position wherein the bearing axial passage 36 is centered within the circumference 15 of the rim 14, to positions which are off center as the hub mount 42 is located to any of multiple positions along the length of the slot 38 in the support member 20. The off center positions result in the wheel rotating about an off center axis of rotation, thereby resulting in eccentric wheel rotation that produces the rocking motion of the stroller.

By releasable lock mechanism is meant any locking mechanism which would be employed by one skilled in the art, which the user can release and reset, which will hold the hub mount 42 in a fixed position on the support member 20. For example, and in no way limiting, such a locking mechanism can include the first body portion 60 having one or more first pins 61 positioned thereon, in locations which are removably engageable within the first openings 23, and, the second body portion 62 having one or more secondary pins 63 positioned thereon, in locations which are removably engageable with the second openings 25.

The pins 61 and 63 are biased into the openings 23 and 25, respectively, by the biasing member, such as the spring 55 shown, and will maintain engagement until released. Release and repositioning is accomplished by the user by contacting and compressing the first body portion 60 toward the second body portion 62 with sufficient force to overcome the biasing member such as the spring 55.

Using this adjustability of the position of the hub mount 42 in sequential moveable engagements of the pins 61 and 63, with the openings 23 and 25 on the ribs 52 and 54 of the support member 20, the position of the outer bearing 32 and the aligned inner bearing 44 where included in the preferred mode can be adjusted. This adjustability allows movement of the hub mount 42 from the first position to the, noted, sequential positions off center. Such, as noted, will cause the wheel device 10 to rotate around the axle 17, from different positions relative to the exterior circumference 15 of the rim 14 to which the support member 20 is engaged.

Such adjustability is preferred as it allows the user to set the engaged rim 15 and tire 16 thereon to roll on a support surface to the first position and impart no rocking to the carriages 12. Should rocking of the carriage be desired, the user can release the locking mechanism holding the hub support 42 and reposition it to sequential positions along the length of the slot 38, further from the first position, and in the direction of the rim circumference 15. Each sequential position closer to the circumference 15 of the rim 14 will impart more rocking motion to a carriage 12 to which the wheel 14 and tire thereon are engaged.

The described device 10 components are shown in FIG. 12 in an exploded side view of the device herein. As shown, the outer hub 30 holds the outer bearing 32 in an engagement therein, and the outer hub 30 engages to the inner hub 40. The hub mount 42 is positioned within the hub cavity 33 with the device 10 assembled, and thereby supports both the outer hub 30 and the inner hub 40 engaged to the outer hub 30 in a sliding connection to the support member 20.

The axle 17 extends through the inner bearing 44 and the inner hub 40 and through the slot 38 of the support member 20 and continues through the hub mount 42 and the outer hub 30. A connector, such as a bearing nut 48, holds the distal end of the axle 17 on an outside edge of the outer bearing 32, during operation of the wheel device 10.

A hub 51 positioned in a central area of the axle 17 is of a larger diameter than the inner bearing passage 46 (FIG. 6) and thereby is in a connection or contact against the inner bearing 44 with the bearing nut 48 engaged to the distal end of the axle 17. Connection to a wheel mount on a carriage 12 is provided by a connector and mating fastener at the proximal end of the axle 17, such as a carriage nut 50 which engages threads on the proximal end of the axle 17, or a compression clip or other connector engageable to the proximal end.

As noted, the wheel device 10 is configured for attachment to existing wheel mounts on existing carriages 12 such as wheel mounts 11 on existing carriage supports such as in FIGS. 1-2 such as wheel mounts 11 on the rear end or steering members on the front or steering end of a carriage 12 which rotate in their engagement to support members of the carriage 12. The wheel device 10 can be provided with an axial passage 46 through the inner bearing 44 to the outer bearing 32 which is configured for operative engagement to an existing axle 17, or it can be provided with an axle 17 engaged to the wheel device 10 which has a proximal end configured to engage a wheel mount 11 at the front or rear end of a carriage 12.

Optionally, the wheel device 10 can include a steering or rotating or steering member 13 as in FIG. 13 and FIG. 2, which engages with the axle 17 at a wheel mount 11 and has a steering mount 19 at an opposite end that will engage to the front member of a carriage having the wheel mount 11 thereon, as in FIG. 2 as a front wheel mount on a rotating member. In another mode, the wheel device 10 can include an engaged rotating or steering member 13 that is connectable to a front support of a carriage 12.

Figure 14:
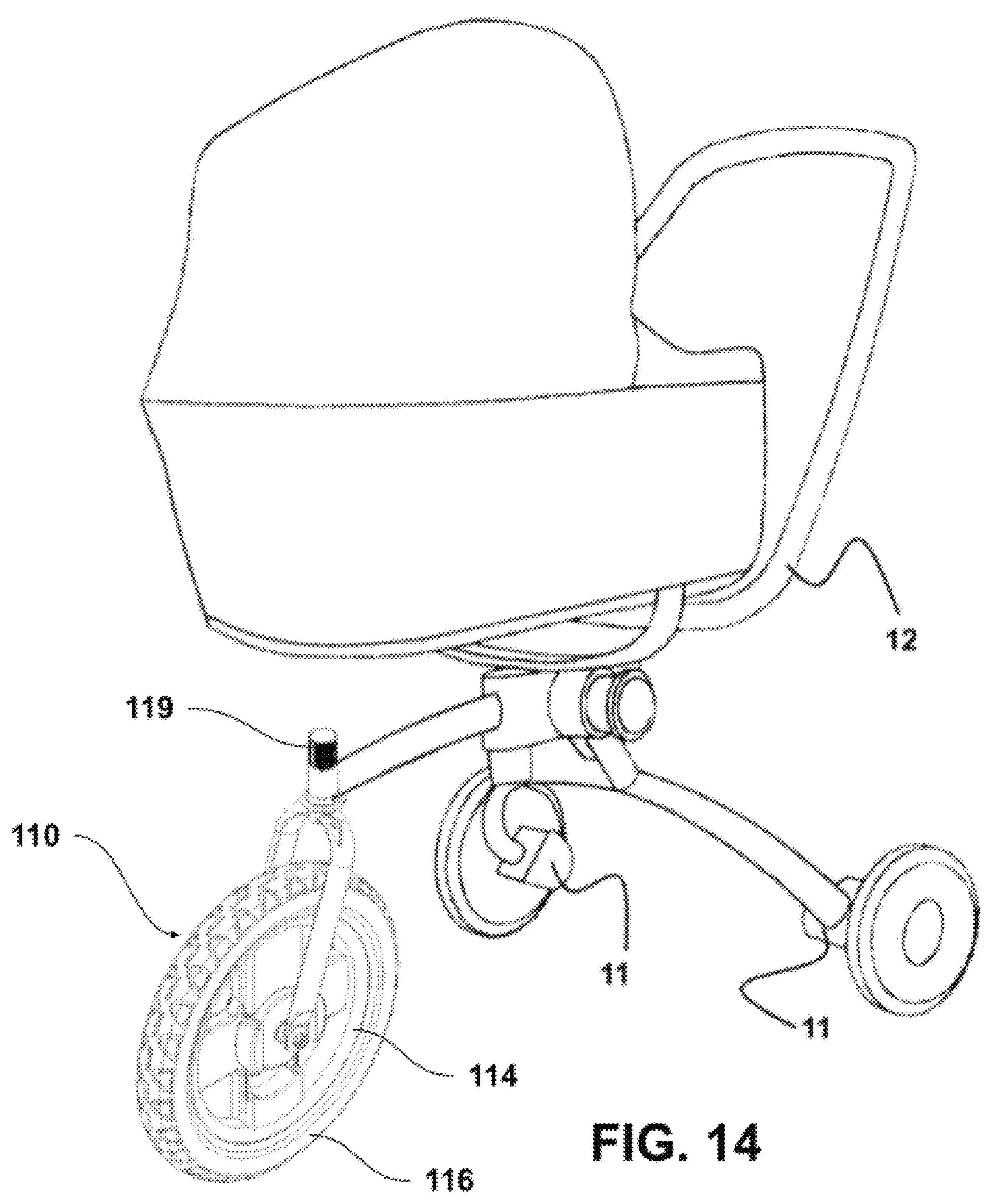
FIG. 14 depicts yet another illustrative embodiment of the rocking system for an infant carriage herein where a single wheel supported from a wheel fork is operatively engaged to a front or steering wheel of the infant carriage which would impart rotation in the R2 direction of FIG. 1.

Now referring to drawings in FIGS. 14-25, wherein similar components are identified by like reference numerals there is seen in FIG. 14, a second illustrative embodiment of a rocking wheel device 110 herein which is configured for engagement to an infant carriage either as an OEM product provided with a carriage 12, or more preferably to enable wider employment of the device 10, as an aftermarket provided device 10 engageable to an infant or child carrier 12.

FIG. 14 depicts the second illustrative embodiment of the device 110 as positioned on the front or steering end of a conventional carrier 12. When provided or engaged to a carriage of this configuration, a forward to rear rocking motion is imparted to the carrier 12 as the user pushes it along a support surface.

Figure 15:
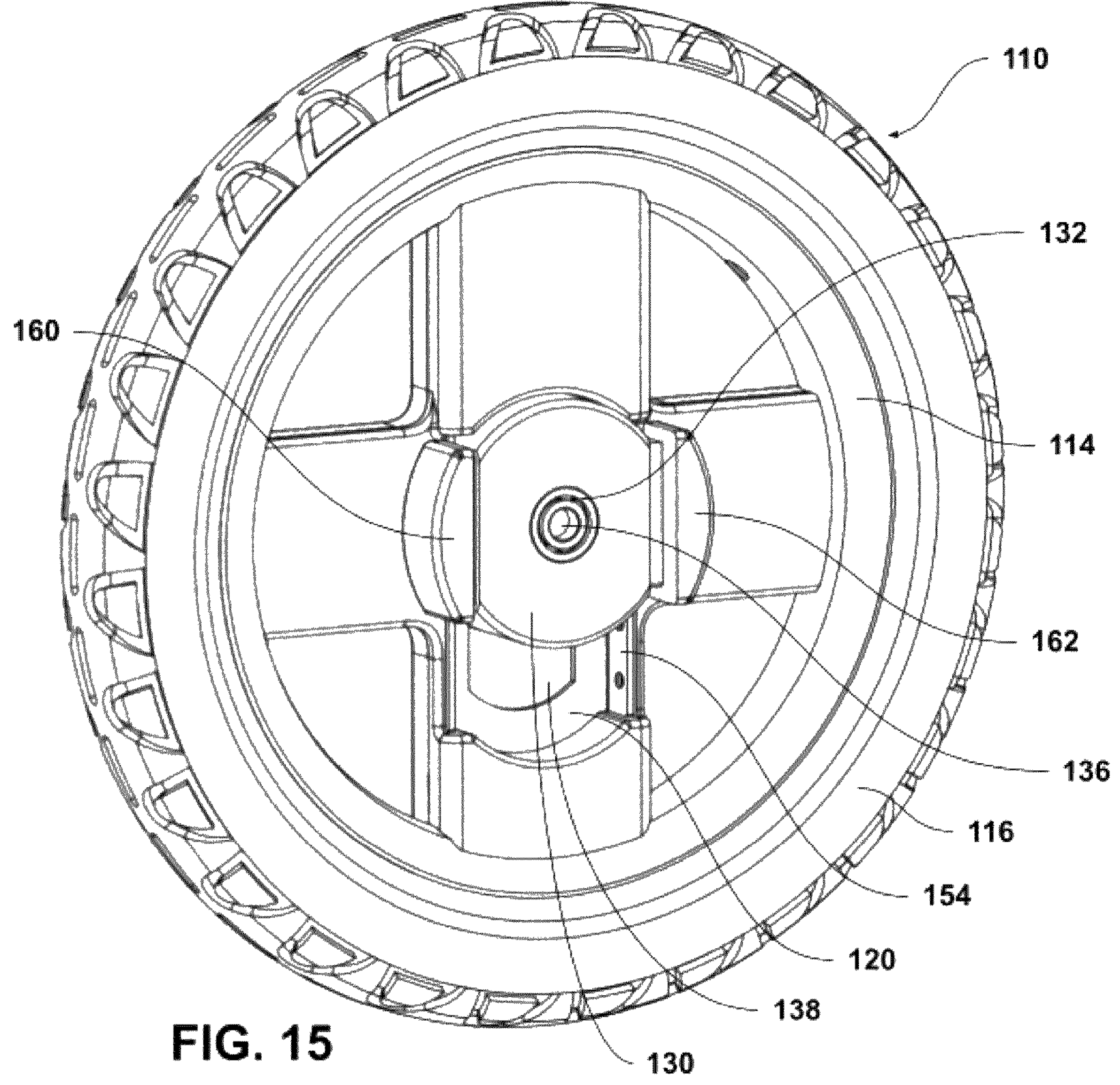
FIG. 15 depicts a first side view of a second illustrative embodiment of the rocking wheel device, employed herein, which can be included with a carriage as in FIG. 14 or which may be provided as an aftermarket device attachable to an axle of any conventional infant carriage, wherein the first hub section of the rocking wheel device is positionable on a support member of the rim of the wheel to different positions from a center position to off center positions.
Figures 24, 25:
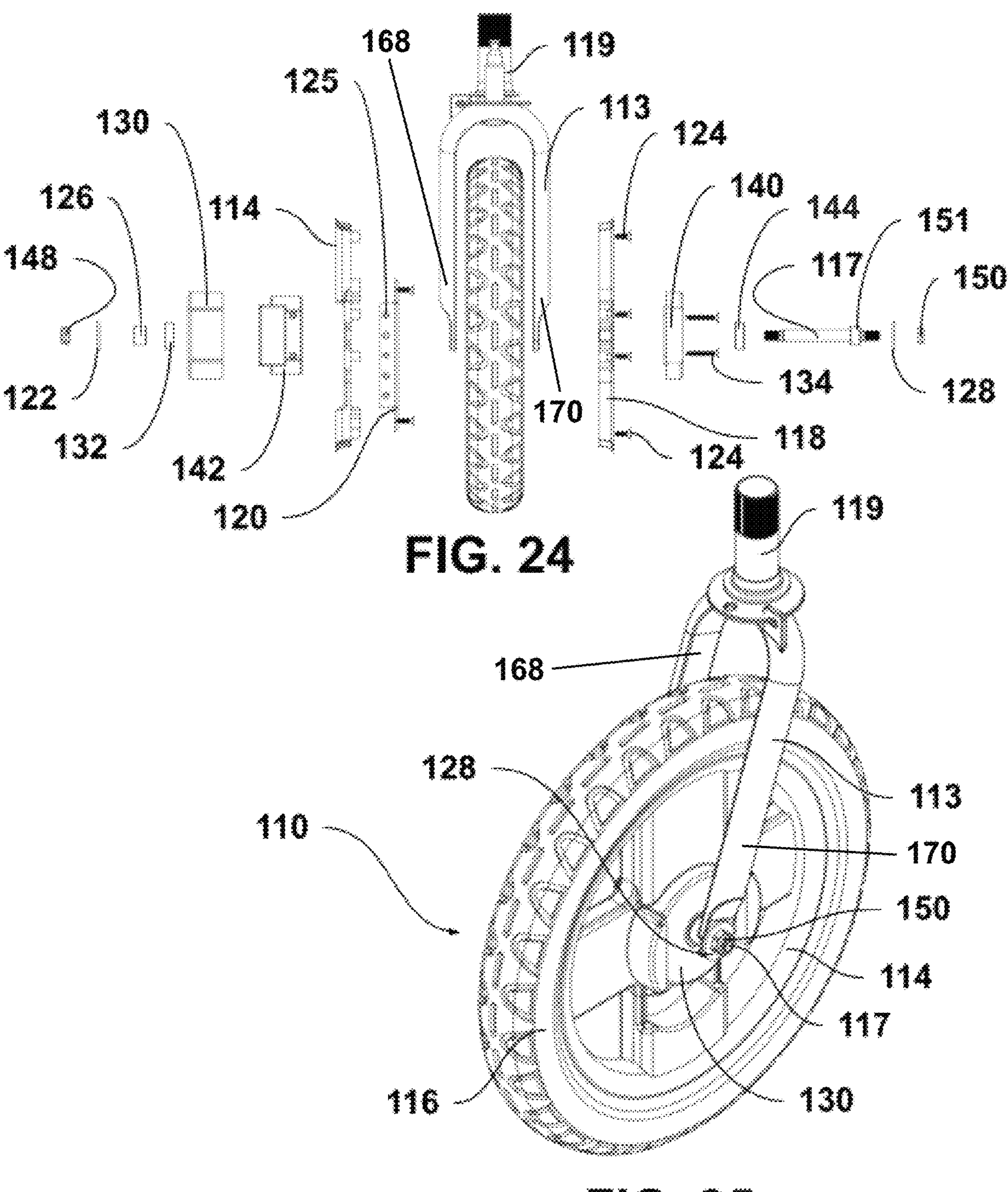
FIG. 24 is an exploded side view of the engageable components of the second illustrative embodiment of the rocking wheel device herein.
FIG. 25 depicts the wheel device showing the rim which is configured to engage a tire, and showing a steering member which can be provided for new and retrofitting of carriages with a single front wheel for steering.

As shown in FIG. 15, a first side view of the second illustrative embodiment of the rocking wheel device 110 is shown. As shown, the device 110 has a rim 114 which is operatively engageable with a tire 116. The device may be provided with the rim 114 whereafter the user may install the desired tire 116, or the device 110 may include a tire 116 operatively engaged to the exterior circumference of the rim 114. In the illustrative embodiment, as shown in FIG. 24, the rim may comprise a first rim section 114 and a second rim section 118 connected together by a plurality of fastener members 124 (e.g., a plurality of screws 124).

Also shown in FIG. 15 is a support member 120 which communicates across the interior of the rim 114. During adjustment of the position of the first hub section 130 (FIG. 17) in directions toward or away from the exterior circumference 115 (FIG. 19), the selected position of the first hub section 130 determines the amount of rocking motion the device 110 will impart to the carriage 12 to which it is operatively engaged. In the illustrative embodiment, as shown in FIGS. 15 and 24, the support member 120 is disposed between the first rim section 114 and the second rim section 118, and the support member 120 may be attached to the first rim section 114 by a plurality of fastener members (e.g., a plurality of screws).

A first side view of the rocking wheel device 110 is depicted in FIG. 15. As shown, a hub assembly 129 depicted herein in FIGS. 17 and 21, for example, is slidably engaged upon the support member 120 such that it will support axle 117 of a support member or steering member 113 such as in FIG. 25, at various positions along the support member 120 from a centered position such as in FIG. 19, to sequential mounting positions which position the axle passage 136 closer to the exterior circumference 115 of the rim 114 thereby increasing an off-center position of the bearing axle passage 136 the closer the bearing axle passage 136 gets to the exterior circumference 115 of the rim 114. Thus, the hub assembly 129 is slidably positionable between a position centering the bearing axle passage 136 within the rim, such as in FIG. 25, where there would be no rocking motion of the carriage, to sequential mounting positions along the support member 120 toward the exterior circumference 115. In each such mounting position closer to the exterior circumference of the hub assembly 129, rocking will sequentially increase over the previous mounting position. In the second illustrative embodiment, in contrast to the first illustrative embodiment, the device 110 has four (4) rocking settings, from a zero rocking setting to a maximum rocking setting. The highest rocking setting of the first illustrative embodiment has been eliminated in the second illustrative embodiment, which reduces the amount of travel of the wheel so as to result in the reduction in the length of the steering member 113 to enable the device 110 to be more easily retrofitted on existing strollers.

As shown, a first hub section 130 provides an operative engagement to hold a first bearing 132 therein. The central portion of an axle 117 (FIG. 25) of the device 110 is positioned within the bearing axial passage 136. The opposed end portions of the axle 117 engage to a forked wheel mount of the carriage 12.

Figure 16:
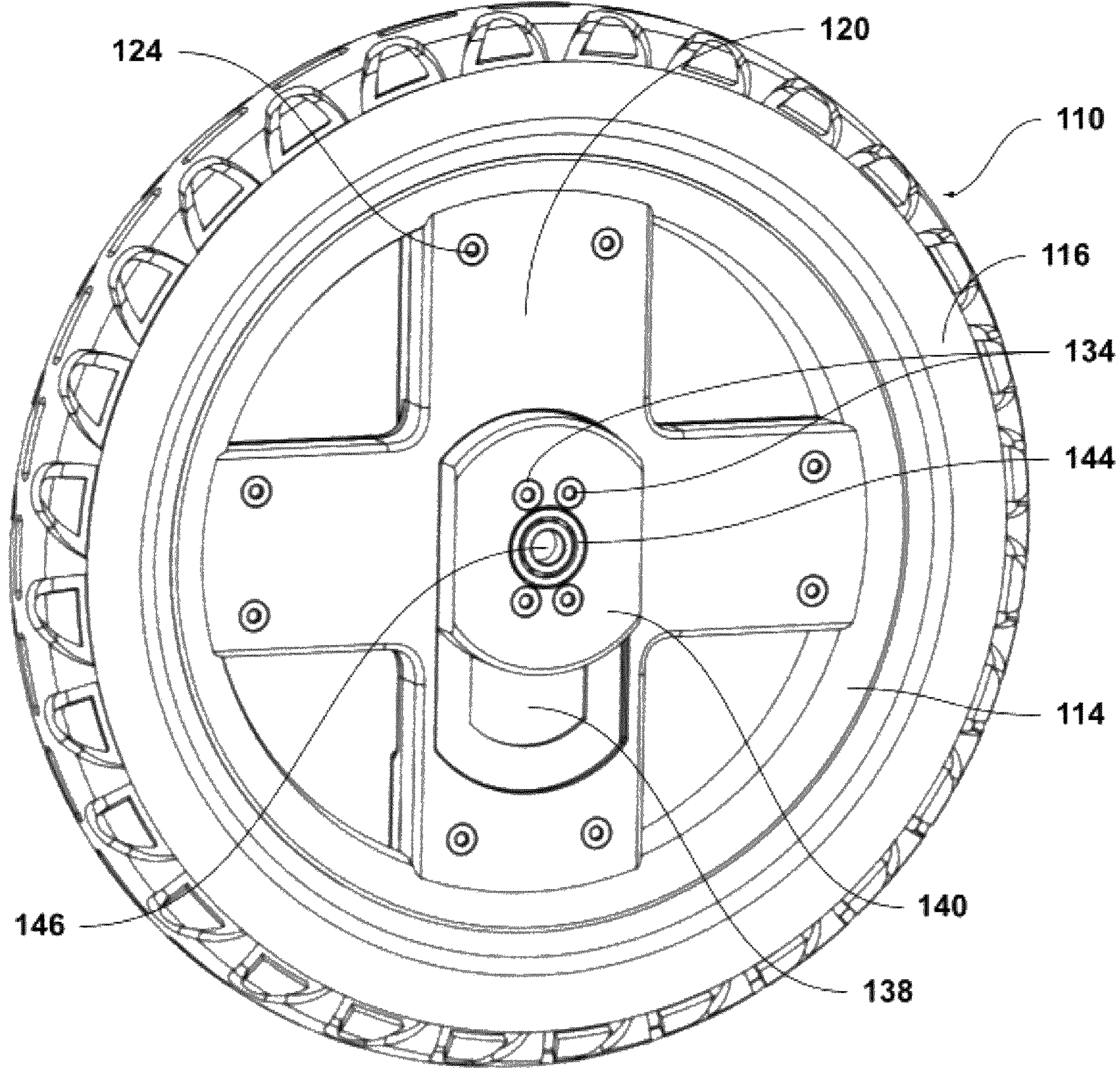
FIG. 16 shows an opposite side view, from that of FIG. 15, of the second illustrative embodiment of the rocking wheel device.
Figures 17, 18:
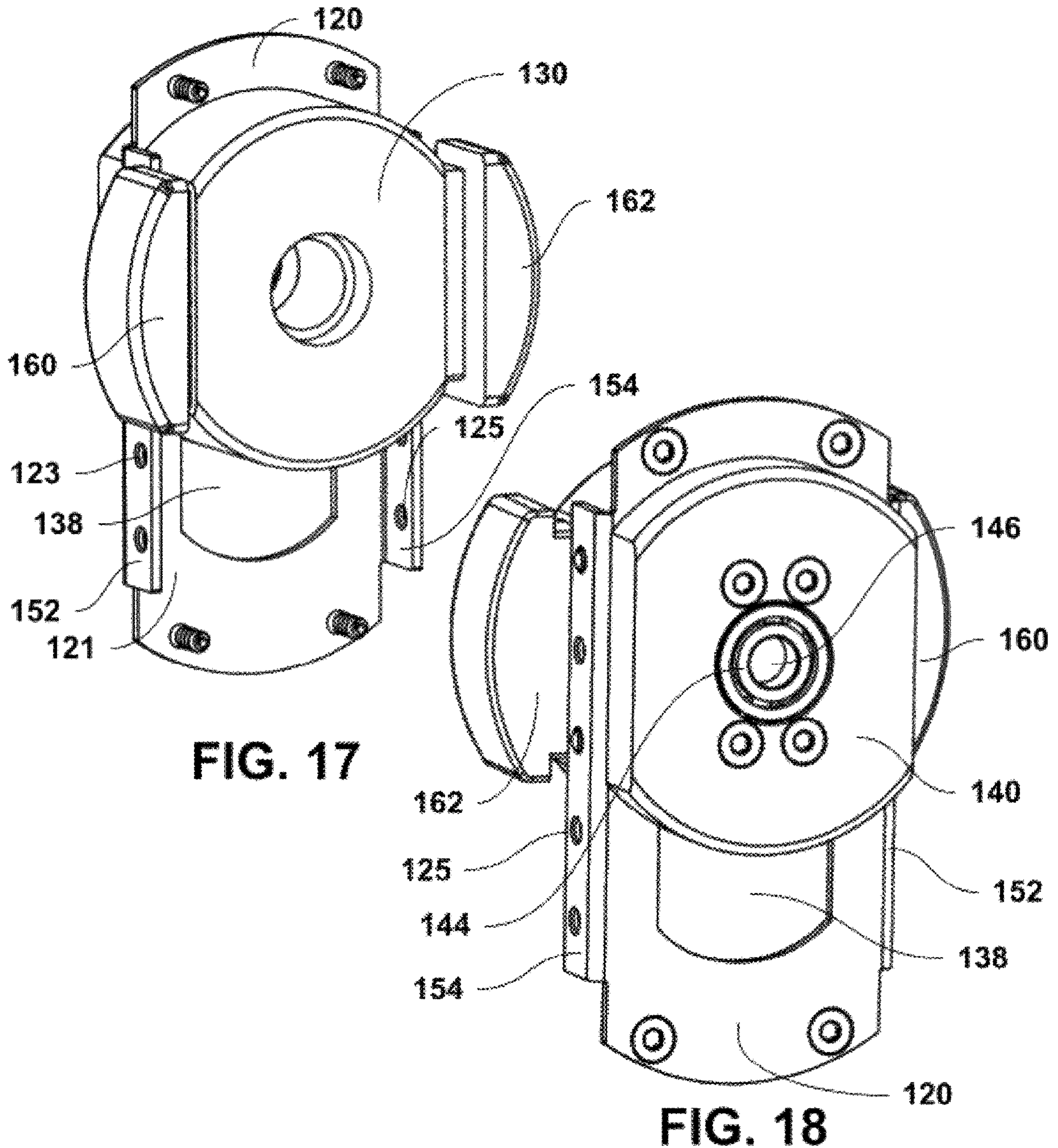
FIG. 17 shows the support member of a rocking wheel herein having a slot wherein the position of a wheel bearing held by a first hub section is adjustable within the slot by positioning of support pins into openings formed on opposing sides of the slot.
FIG. 18 depicts a view of the opposite side of the support member showing a second hub section which is engaged by fasteners communicating through the slot to the first hub section.
Figures 19, 20:
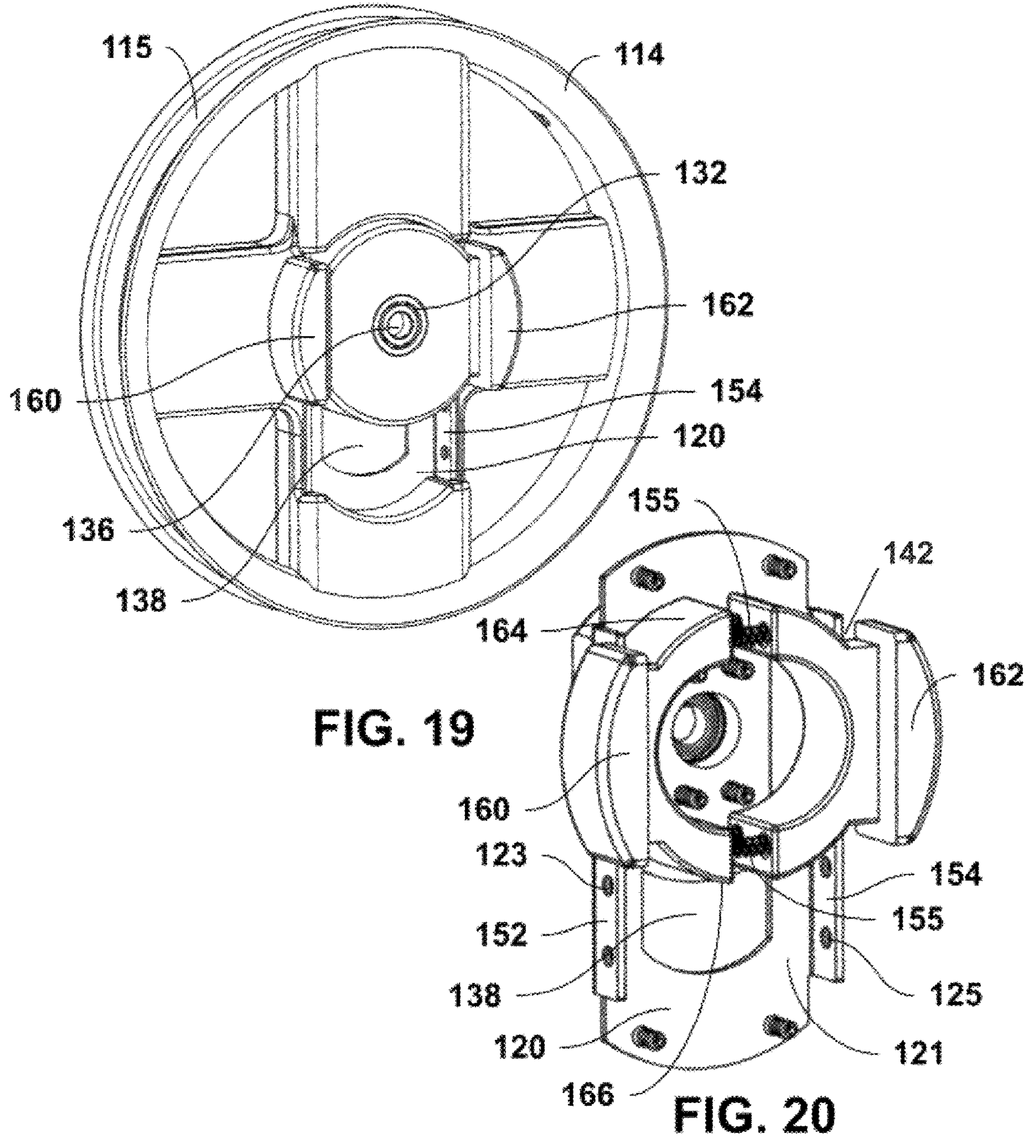
FIG. 19 shows the support member herein engaged within a rim which is adapted for engagement to a tire, and showing the first hub section removably positioned to a centered position relative to the circumference of the rim.
FIG. 20 depicts the support member of the rocking wheel herein, such as in FIG. 17, where the first hub section is removed to show fasteners which engage between the rear hub and front hub, and showing an adjustable connector which is employable to removably position the first hub section to varying positions along the slot.
Figures 21, 22, 23:
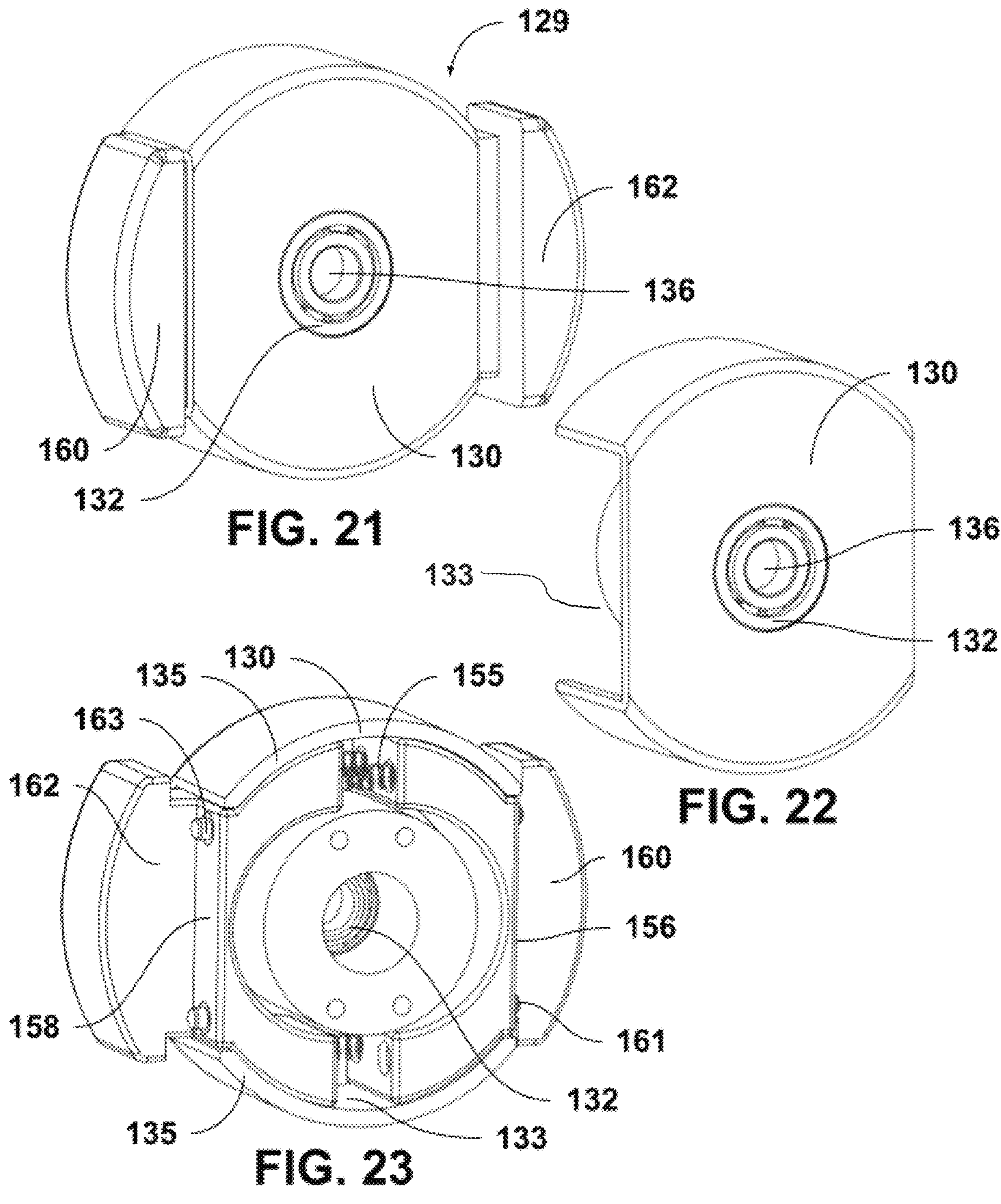
FIG. 21 shows the first hub section in operative engagement over the connector.
FIG. 22 shows the first hub section and a first bearing engaged therein which is adapted to hold the axle of a carriage.
FIG. 23 shows an opposite view from that of FIG. 21, and shows the connector operatively engaged within a cavity formed on one side of the first hub section, wherein the connector supports the first hub section to varying positions along the slot.

Also shown in the second side view of FIG. 16 is a slot 138 formed into the support member 120 which is operatively engaged to the interior circumference of the rim 114. As described herein, the first hub section 130 is connected with fasteners to a second hub section 140. This positions the support member 120 and slot 138 therein in a sandwiched engagement in between the first hub section 130 and the second hub section 140. As shown in FIGS. 16, 20, and 24, the second hub section 140 is connected to the hub mount 142 by a plurality of fasteners 134.

As described herein, the positioning of both the first hub section 130 and the second hub section 140, and bearings therein, to differing positions within the slot 138 is provided by a hub mount 142 (see FIG. 20) which supports the first hub section 130, which is in turn engaged to the second hub section 140. Thus, movement of the hub mount 142, to positions along the elongated slot 138, concurrently moves both the first hub section 130 and second hub section 140 as well as the first bearing 132 and a second bearing 144 connected to the second hub section 140.

As shown in the drawings, and more particularly in FIG. 20, the axle 117, of the device 110, communicates along an axle passage formed by the first bearing axial passage 136 and an aligned second bearing passage 146. Bearing connectors, such as bearing nuts 148, 150, on the opposed ends of the axle 117 (FIG. 24) holds the opposed ends and central portion of the axle 117 in place.

In FIGS. 17-23 are shown components of the device herein and their movable positioning upon the support member 120. As shown, the support member 120 of the rocking wheel device 110 herein has the slot 138 therein, through which the first hub section 130 is engaged to the second hub section 140, with the hub mount 142 positioned therebetween. The support member 120 also has a recess 121 positioned between a first rib 152 and a parallel second rib 154 which extend from the support member 120.

A plurality of pairs of aligned openings are provided by first openings 123 sequentially formed into the first rib 152 and spaced apart across from and aligned with second openings 125 sequentially formed into the second rib 154. The plurality of pairs of openings are positioned with a first pair of aligned openings located closest to a center point of the rim, to a last pair of aligned openings positioned furthest from the center point of the rim. Each of the pairs of aligned openings are sequentially spaced from adjacent such pairs of aligned openings.

In operation, the position of the first wheel bearing 132, having the bearing axial passage 136 which supports the axle 117 (FIG. 25), can be seen as being held in place by the first hub section 130. A hub mount 142, is positioned to provide a supporting engagement with the first hub section 130 by a positioning thereof within a hub cavity 133 formed in the first hub section 130. By supporting engagement is meant, for example, that the hub mount 142 positioned within the hub cavity 133 contacts against surfaces of the hub 130 defining the hub cavity 133, to thereby support the surrounding first hub section 130, to hold it in positions within the recess 121.

Because the first hub section 130 is connected to the second hub section 140, the supporting engagement of the hub mount 142 also holds the second hub section 140 in positions upon the support member 120. For example, an upper surface 164 and lower surface 166 of the hub mount 142, positioned within the hub cavity 133 contacts against hub sidewalls 135 defining the hub cavity 133 (see FIG. 23).

In a view of the hub mount 142, as shown in FIG. 20, the first hub section 130 has been removed to more clearly show the operation of the hub mount 142. As shown, the first rib 152 and second rib 154 run substantially parallel and project from opposing sides of the support member 120. The recess 121 is shown formed between the first rib 152 and second rib 154.

The hub mount 142 is positioned in an engagement with the first hub section 130 within the recess 133 formed in the first hub section 130. By engagement is meant that the first hub section 130 is supported by the hub mount 142 and is not engaged to the support member 120 other than contacting or sliding against it during translation on the support member 120.

The hub mount 142 is in a sliding engagement with the support member 120. By sliding engagement is meant, for example, that a first side surface 156 of the hub mount 142 is positioned to slide along an inner surface of the first rib 152 which faces the recess 121, and a second side surface 158 of the hub mount 142 is positioned to slide along an inner surface of the second rib 154 which faces the inner surface of the first rib 152.

The hub mount 142 has a first body portion 160 and a second body portion 162. A biasing member, such as springs 155, imparts a biasing force to bias the first body portion 160 toward the inside surface of the first rib 152 and the second body portion 162 against the inside surface of the second rib 154. The hub mount has a releasable locking mechanism allowing the user to slide the hub mount 142 within the recess 121 from a first position wherein it holds the first hub section 130 in a first position wherein the bearing axial passage 136 is centered within the circumference 115 of the rim 114, to positions which are off center as the hub mount 142 is located to any of multiple positions along the length of the slot 138 in the support member 120. The off center positions result in the wheel rotating about an off center axis of rotation, thereby resulting in eccentric wheel rotation that produces the rocking motion of the stroller.

By releasable lock mechanism is meant any locking mechanism which would be employed by one skilled in the art, which the user can release and reset, which will hold the hub mount 142 in a fixed position on the support member 120. For example, and in no way limiting, such a locking mechanism can include the first body portion 160 having one or more first pins 161 positioned thereon, in locations which are removably engageable within the first openings 123, and, the second body portion 162 having one or more secondary pins 163 positioned thereon, in locations which are removably engageable with the second openings 125.

The pins 161 and 163 are biased into the openings 123 and 125, respectively, by the biasing member, such as the spring 155 shown, and will maintain engagement until released. Release and repositioning is accomplished by the user by contacting and compressing the first body portion 160 toward the second body portion 162 with sufficient force to overcome the biasing member such as the spring 155.

Using this adjustability of the position of the hub mount 142 in sequential moveable engagements of the pins 161 and 163, with the openings 123 and 125 on the ribs 152 and 154 of the support member 120, the position of the first bearing 132 and the aligned second bearing 144 can be adjusted. This adjustability allows movement of the hub mount 142 from the first position to the, noted, sequential positions off center. Such, as noted, will cause the wheel device 110 to rotate around the axle 117, from different positions relative to the exterior circumference 115 of the rim 114 to which the support member 120 is engaged.

Such adjustability is preferred as it allows the user to set the engaged rim 115 and tire 116 thereon to roll on a support surface to the first position and impart no rocking to the carriages 112. Should rocking of the carriage be desired, the user can release the locking mechanism holding the hub support 142 and reposition it to sequential positions along the length of the slot 138, further from the first position, and in the direction of the rim circumference 115. Each sequential position closer to the circumference 115 of the rim 114 will impart more rocking motion to a carriage 112 to which the wheel 114 and tire thereon are engaged.

The described device 110 components are shown in FIG. 24 in an exploded side view of the device herein. As shown, the first hub section 130 holds the first bearing 132 in an engagement therein, and the first hub section 130 engages to the second hub section 140. The hub mount 142 is positioned within the hub cavity 133 with the device 110 assembled, and thereby supports both the first hub section 130 and the second hub section 140 engaged to the first hub section 130 in a sliding connection to the support member 120.

The axle 117 extends through the second bearing 144 and the second hub section 140 and through the slot 138 of the support member 120 and continues through the hub mount 142 and the first hub section 130. Connectors, such as bearing nuts 148, 150, hold the opposed ends of the axle 117 on the outside edges of the bearings 132, 144, during operation of the wheel device 110.

A first axle hub 151 positioned in a first section of the axle 117 is of a larger diameter than the first bearing passage 136 (FIG. 21) and thereby is in a connection or contact against the first bearing 132 with the bearing nut 150 engaged to a first opposed end of the axle 117. Similarly, a second axle hub 126 positioned in a second section of the axle 117 is of a larger diameter than the second bearing passage 146 (FIG. 18) and thereby is in a connection or contact against the second bearing 144 with the bearing nut 148 engaged to a second opposed end of the axle 117. In the second illustrative embodiment, the first axle hub 151 and second axle hub 126 are disposed on respective opposed sides of the hub assembly 129 to maintain the wheel device 110 in a centered position between opposed distal tine ends of a forked wheel mount. In the second illustrative embodiment, connection to opposed distal ends of the forked wheel mount on a carriage 12 is provided by washers 122, 128 and fasteners at the opposed ends of the axle 117, such as a carriage nuts 148, 150 which engage threads on the opposed ends of the axle 117, or compression clips or other connectors engageable to the opposed ends of the axle 117.

As noted, the wheel device 110 is configured for attachment to existing wheel mounts on existing carriages 12 such as wheel mounts 11 on existing carriage supports such as in FIGS. 1-2 such as wheel mounts 11 on the rear end or steering members on the front or steering end of a carriage 12 which rotate in their engagement to support members of the carriage 12. The wheel device 110 can be provided with an axial passage through the second bearing 144 to the first bearing 132 which is configured for operative engagement to an existing axle 117, or it can be provided with an axle 117 engaged to the wheel device 110 which has a central axle portion configured to engage a wheel mount 11 at the front or rear end of a carriage 12.

Optionally, the wheel device 110 can include a forked steering or rotating or steering member 113 as in FIG. 25 and FIG. 14, which engages with the axle 117 at opposed distal ends of the forked steering member 113 and has a steering mount 119 at an opposite proximal end that will engage to the front member of a carriage having the wheel mount thereon, as in FIG. 14 as a front wheel mount on a rotating member. As shown in FIGS. 24 and 25, the forked steering member 113 includes a first tine 168 and a second tine 170 spaced apart from the first tine 168. In another mode, the wheel device 110 can include an engaged rotating or steering member 113 that is connectable to a front support of a carriage 12. Advantageously, the wheel device 110 also is able to be used in the steering setting of steering member (i.e., a setting which allows the steering member to rotate for turning the stroller).

While all of the fundamental characteristics and features of the disclosed rocking infant carriage wheel device and system herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

The invention claimed is:

1. A carriage rocking system, comprising:

an axle coupled to a wheel mount member which is configured for engagement to a carriage;

a rim, said rim having an exterior circumference engageable with a tire;

said rim having a support member extending across an interior opening within said exterior circumference;

a slot in said support member;

a hub assembly in a sliding engagement with said support member;

said hub assembly having at least one bearing therein;

an axle passage extending through said at least one bearing and through said slot, said axle passage engageable to said axle of said wheel mount member;

said hub assembly in said sliding engagement with said support member;

a removable engagement of said hub assembly removably mounting said hub assembly to any one of a plurality of respective mounting positions upon said support member between a first one of said plurality of respective mounting positions and a last one of said plurality of respective mounting positions; and said first one of said plurality of respective mounting positions being centered within said exterior circumference of said rim, said last one of said plurality of respective mounting positions being closest to said exterior circumference of said rim;

wherein said axle is centered within said rim in said first one of said plurality of respective mounting positions such that said carriage rocking system is configured to impart no rocking motion to said carriage as said carriage is pushed by a user; and wherein said axle is off center relative to said rim in said last one of said plurality of respective mounting positions such that said carriage rocking system is configured to produce eccentric wheel rotation and a resulting rocking motion of said carriage as said carriage is pushed by said user.

2. The carriage rocking system according to claim 1, wherein said wheel mount member comprises a forked wheel mount member, said forked wheel mount member including a first tine and a second tine spaced apart from said first tine, and said forked wheel mount 3 member having a first end and a second end, said first end of said forked wheel mount member configured for engagement to said carriage, and said axle positioned at said second end of said wheel mount member with a portion of said rim being disposed between said first tine and said second tine.

3. The carriage rocking system according to claim 2, wherein said axle extends between said first tine and said second tine, a first end portion of said axle having a first fastener member disposed thereon proximate to said first tine, and a second end portion of said axle having a second fastener member disposed thereon proximate to said second tine so as to secure said axle to said first and second tines.

4. The carriage rocking system according to claim 1, further comprising:

a first rib extending from a first surface of said support member;

a second rib extending from said first surface of said support member opposite to and parallel to said first rib;

a recess positioned between said first rib, said second rib, and said first surface of said support member; and said sliding engagement of said hub assembly being along said recess.

5. The carriage rocking system according to claim 4, wherein said removable engagement of said hub assembly comprises:

a first plurality of openings formed into said first rib;

a second plurality of openings formed into said second rib;

a first pin extending from a first side of said hub assembly, said first pin positionable in a removably biased engagement with any one of said first plurality of openings; and a second pin extending from a second side of said hub assembly, said second pin positionable in a removably biased engagement with any one of said second plurality of openings.

6. The carriage rocking system according to claim 5, further comprising:

said at least one bearing of said hub assembly including a first bearing and a second bearing;

said hub assembly having a first hub section, said first bearing engaged with said first hub section;

said hub assembly having a second hub section positioned upon an opposite side of said support member from said first hub section, said second hub section being connected to said first hub section;

said first hub section having a hub cavity therein;

a first body portion slidably engaged within said hub cavity;

a second body portion slidably engaged within said hub cavity;

a biasing member engaged between said first body portion and said second body portion in a gap therebetween, said biasing member biasing said first body portion away from said second body portion;

said first pin extending from a mount upon said first body portion; and said second pin extending from a mount upon said second body portion.

7. The carriage rocking system according to claim 6, further comprising:

said second bearing engaged with said second hub section, said second bearing having a secondary axle passage therein; and said axle passage communicating through said first bearing and through said slot, and through said secondary axle passage.

8. The carriage rocking system according to claim 1, wherein said rim comprises a first rim section and a second rim section, and said support member is disposed between said first rim section and said second rim section.

9. A carriage rocking system, comprising:

an axle coupled to a wheel mount member which is configured for engagement to a carriage;

a rim, said rim having an exterior circumference engageable with a tire;

said rim having a support member extending across an interior opening within said exterior circumference;

a slot in said support member;

a hub assembly in a sliding engagement with said support member;

said hub assembly having at least one bearing therein;

an axle passage extending through said at least one bearing and through said slot, said axle passage engageable to said axle of said wheel mount member;

said hub assembly in said sliding engagement with said support member;

a removable engagement of said hub assembly removably mounting said hub assembly to any one of a plurality of respective mounting positions upon said support member between a first one of said plurality of respective mounting positions and a last one of said plurality of respective mounting positions; and said first one of said plurality of respective mounting positions being centered within said exterior circumference of said rim, said last one of said plurality of respective mounting positions being closest to said exterior circumference of said rim;

wherein said wheel mount member comprises a forked wheel mount member, said forked wheel mount member including a first tine and a second tine spaced apart from said first tine, and said forked wheel mount member having a first end and a second end, said first end of said forked wheel mount member configured for engagement to said carriage, and said axle positioned at said second end of said wheel mount member with a portion of said rim being disposed between said first tine and said second tine; and wherein said axle extends between said first tine and said second tine, a first end portion of said axle having a first fastener member disposed thereon proximate to said first tine, and a second end portion of said axle having a second fastener member disposed thereon proximate to said second tine so as to secure said axle to said first and second tines.

10. The carriage rocking system according to claim 9, further comprising:

a first rib extending from a first surface of said support member;

a second rib extending from said first surface of said support member opposite to and parallel to said first rib;

a recess positioned between said first rib, said second rib, and said first surface of said support member; and said sliding engagement of said hub assembly being along said recess.

11. The carriage rocking system according to claim 10, wherein said removable engagement of said hub assembly comprises:

a first plurality of openings formed into said first rib;

a second plurality of openings formed into said second rib;

a first pin extending from a first side of said hub assembly, said first pin positionable in a removably biased engagement with any one of said first plurality of openings; and a second pin extending from a second side of said hub assembly, said second pin positionable in a removably biased engagement with any one of said second plurality of openings.

12. The carriage rocking system according to claim 11, further comprising:

said at least one bearing of said hub assembly including a first bearing and a second bearing;

said hub assembly having a first hub section, said first bearing engaged with said first hub section;

said hub assembly having a second hub section positioned upon an opposite side of said support member from said first hub section, said second hub section being connected to said first hub section;

said first hub section having a hub cavity therein;

a first body portion slidably engaged within said hub cavity;

a second body portion slidably engaged within said hub cavity;

a biasing member engaged between said first body portion and said second body portion in a gap therebetween, said biasing member biasing said first body portion away from said second body portion;

said first pin extending from a mount upon said first body portion; and said second pin extending from a mount upon said second body portion.

13. The carriage rocking system according to claim 12, further comprising:

said second bearing engaged with said second hub section, said second bearing having a secondary axle passage therein; and said axle passage communicating through said first bearing and through said slot, and through said secondary axle passage.

14. The carriage rocking system according to claim 9, wherein said rim comprises a first rim section and a second rim section, and said support member is disposed between said first rim section and said second rim section.

15. A carriage rocking system, comprising:

an axle coupled to a wheel mount member which is configured for engagement to a carriage;

a rim, said rim having an exterior circumference engageable with a tire;

said rim having a support member extending across an interior opening within said exterior circumference;

a slot in said support member;

a hub assembly in a sliding engagement with said support member;

said hub assembly having at least one bearing therein;

an axle passage extending through said at least one bearing and through said slot, said axle passage engageable to said axle of said wheel mount member;

said hub assembly in said sliding engagement with said support member;

a first rib extending from a first surface of said support member;

a second rib extending from said first surface of said support member opposite to and parallel to said first rib;

a recess positioned between said first rib, said second rib, and said first surface of said support member;

said sliding engagement of said hub assembly being along said recess;

a removable engagement of said hub assembly removably mounting said hub assembly to any one of a plurality of respective mounting positions upon said support member between a first one of said plurality of respective mounting positions and a last one of said plurality of respective mounting positions; and said first one of said plurality of respective mounting positions being centered within said exterior circumference of said rim, said last one of said plurality of respective mounting positions being closest to said exterior circumference of said rim;

wherein said removable engagement of said hub assembly comprises:

a first plurality of openings formed into said first rib;

a second plurality of openings formed into said second rib;

a first pin extending from a first side of said hub assembly, said first pin positionable in a removably biased engagement with any one of said first plurality of openings; and a second pin extending from a second side of said hub assembly, said second pin positionable in a removably biased engagement with any one of said second plurality of openings.

16. The carriage rocking system according to claim 15, further comprising:

said at least one bearing of said hub assembly including a first bearing and a second bearing;

said hub assembly having a first hub section, said first bearing engaged with said first hub section;

said hub assembly having a second hub section positioned upon an opposite side of said support member from said first hub section, said second hub section being connected to said first hub section;

said first hub section having a hub cavity therein;

a first body portion slidably engaged within said hub cavity;

a second body portion slidably engaged within said hub cavity;

a biasing member engaged between said first body portion and said second body portion in a gap therebetween, said biasing member biasing said first body portion away from said second body portion;

said first pin extending from a mount upon said first body portion; and said second pin extending from a mount upon said second body portion.

17. The carriage rocking system according to claim 16, further comprising:

said second bearing engaged with said second hub section, said second bearing having a secondary axle passage therein; and said axle passage communicating through said first bearing and through said slot, and through said secondary axle passage.

18. The carriage rocking system according to claim 15, wherein said rim comprises a first rim section and a second rim section, and said support member is disposed between said first rim section and said second rim section.

19. The carriage rocking system according to claim 15, wherein said wheel mount member comprises a forked wheel mount member, said forked wheel mount member including a first tine and a second tine spaced apart from said first tine, and said forked wheel mount member having a first end and a second end, said first end of said forked wheel mount member configured for engagement to said carriage, and said axle positioned at said second end of said wheel mount member with a portion of said rim being disposed between said first tine and said second tine.

20. The carriage rocking system according to claim 19, wherein said axle extends between said first tine and said second tine, a first end portion of said axle having a first fastener member disposed thereon proximate to said first tine, and a second end portion of said axle having a second fastener member disposed thereon proximate to said second tine so as to secure said axle to said first and second tines.

* * * * *